US010131777B2

(12) United States Patent
Ihara et al.

(10) Patent No.: US 10,131,777 B2
(45) Date of Patent: Nov. 20, 2018

(54) COMPOSITE OF POLYMER AND TUNGSTIC ACID AND/OR MOLYBDIC ACID

(71) Applicant: National University Corporation Kumamoto University, Kumamoto-shi, Kumamoto (JP)

(72) Inventors: Hirotaka Ihara, Kumamoto (JP); Hirokuni Jintoku, Kumamoto (JP)

(73) Assignee: National University Corporation Kumamoto University, Kumamoto (JP)

( * ) Notice: Subject to any disclaimer, the term of this patent is extended or adjusted under 35 U.S.C. 154(b) by 0 days.

(21) Appl. No.: 14/408,519

(22) PCT Filed: Jun. 17, 2013

(86) PCT No.: PCT/JP2013/066582
§ 371 (c)(1),
(2) Date: Dec. 16, 2014

(87) PCT Pub. No.: WO2013/191130
PCT Pub. Date: Dec. 27, 2013

(65) Prior Publication Data
US 2015/0197628 A1    Jul. 16, 2015

(30) Foreign Application Priority Data

Jun. 18, 2012  (JP) .................................. 2012-137177
Feb. 18, 2013  (JP) .................................. 2013-028739

(51) Int. Cl.
C08L 33/12     (2006.01)
C08L 1/12      (2006.01)
C08F 120/20    (2006.01)
C08F 120/14    (2006.01)
C09D 133/06    (2006.01)
C09D 133/14    (2006.01)
C09D 133/26    (2006.01)
C09D 129/04    (2006.01)
C08K 3/32      (2006.01)
C08K 3/34      (2006.01)

(52) U.S. Cl.
CPC ............ *C08L 33/12* (2013.01); *C08F 120/14* (2013.01); *C08F 120/20* (2013.01); *C08K 3/32* (2013.01); *C08K 3/34* (2013.01); *C08L 1/12* (2013.01); *C09D 129/04* (2013.01); *C09D 133/066* (2013.01); *C09D 133/14* (2013.01); *C09D 133/26* (2013.01); *C08K 2003/328* (2013.01); *C08L 2201/10* (2013.01); *C08L 2203/16* (2013.01)

(58) Field of Classification Search
CPC ....................................................... C08L 1/12
See application file for complete search history.

(56) References Cited

U.S. PATENT DOCUMENTS 4,691,045 A    9/1987  Fukuchi et al.
5,364,729 A *  11/1994 Kmiecik-Lawrynowicz ..............
                                                    G03G 9/0804
                                                      430/137.14
7,498,112 B2 * 3/2009  Sweeney .............. G03G 9/0804
                                                      430/108.1

FOREIGN PATENT DOCUMENTS

BR    200905108 A2 *  1/2011
CN        1872911 A   12/2006
JP      61-134350 A    6/1986
JP      61-187917 A    8/1986
JP      09-221598 A    8/1997
JP    2001-035509 A    2/2001
JP    2005-154710 A    6/2005
JP    2006-022291 A    1/2006
JP    2007-326919 A   12/2007
KR       100843569 B1 *  7/2008

OTHER PUBLICATIONS

Washington University (Wood Chemistry PSE 406/Chem E470, http://depts.washington.edu/pse406/Notes%20pdf/406-5%20Cellulose%20I.pdf).*
Machine translation of BR200905108A2, 2011.*
Machine translation of KR-100843569-B1. (Year: 2008).*
Chinese First Office Action with English translation for corresponding application No. 201380032384.9, dated Nov. 20, 2015 (8 pgs.).
Rong Yi, et al., *Polymer Materials Science and Engineering*, vol. 27, Issue 4, pp. 155-158, Apr. 2011, with partial English translation.
Lin Mei, "Study on Preparation and Optical Characteristics of Polymer/Inorganic nanocomposite film," Chinese Master's Theses Full-text Database (*Engineering Science and Technology I*), 2008, B020-105 with partial English translation.
Ni Li-Li, "Study on Preparation and Photochromic Properties of Inorganic/Organic Composite Films," Chinese Master's Theses Full-text Database (*Engineering Science and Technology I*), 2009, B020-253 with partial English translation.
International Search Report from International Application No. PCT/JP2013/066582, dated Jul. 9, 2013.
Chęckiewicz et al., "Synthesis and Characterization of the Proton-Conducting Gels Based on PVdF and PMMA Matrixes Doped with Heteropolyacids," *Chemistry of Materials*, 2001, vol. 13, pp. 379-384.
Office Action dated Mar. 15, 2016, for corresponding Japanese Application No. 2014-521454.
Oliveira, et al., "Micro- and nanocomposites of Keggin heteropolymetalates in cellulose esters," *Surface and Interface Analysis*, 2002, vol. 34, pp. 580-582.

(Continued)

*Primary Examiner* — Wenwen Cai
(74) *Attorney, Agent, or Firm* — Brinks Gilson & Lione

(57) ABSTRACT

A method produces a composite of a polymer and tungstic acid and/or molybdic acid; and the composite obtained by the method has high transparency and a desired refractive index. This composite contains tungstic acid and/or molybdic acid and a polymer that has a number average molecular weight of 1,000-10,000,000 and an ether bond and/or an ester bond. The content of tungstic acid and/or molybdic acid in the composite is 0.01-95% by weight.

9 Claims, 4 Drawing Sheets

(56) References Cited

OTHER PUBLICATIONS

Zukowska, et al., "Anhydrous gel electrolytes doped with silicotungstic acid," *Electrochimica Acta*, 2003, vol. 48, pp. 2157-2164.
Japanese Office Action with English translation for corresponding application No. 2014-521454, dated Oct. 3, 2016, 8 pgs.

* cited by examiner

COMPOSITE OF POLYMER AND TUNGSTIC ACID AND/OR MOLYBDIC ACID

CROSS-REFERENCE TO RELATED APPLICATIONS

This application is a National Stage application of PCT Application No. PCT/JP2013/066582, filed on Jun. 17, 2013, which claims priority to Japanese Patent Application No. 2013-028739, filed Feb. 18, 2013, and to Japanese Patent Application No. 2012-137177 filed on Jun. 18, 2012.

TECHNICAL FIELD

The present invention relates to a method for producing a composite of a polymer and tungstic acid and/or molybdic acid and a composite obtained according to the production method.

BACKGROUND ART

Refractive index is a physical property that is greatly affected by constituent elements, molecular structure, crystal structure and electric charge, and is therefore not easily adjusted. Normally, the refractive index of polymers is limited to the vicinity of 1.4 to 1.6, demonstrating a narrower range of variation in comparison with the range of 0.17 (silver) to 4.2 (silicon) of inorganic materials. This is due to the main component of polymers being mainly composed of carbon that has low atomic refraction. However, in order to take advantage of the moldability and light weight of polymers, refractive index has been increased through molecular design such as the introduction of sulfur atoms or bromine atoms in applications such as lenses. In addition, although metal oxide fine particles having a high refractive index (such as alumina (see, for example, Patent Document 1), titania or zirconia) have been compounded since modulating the refractive index of high-performance polymers cannot be achieved by rearranging constituent elements, in order to enhance transparency, it is necessary to uniformly disperse metal oxide fine particles having a size on the order of several nanometers, thereby making the procedure difficult.

Although research and development has been actively conducted on organic EL, LED lighting or laser elements, since these devices require that the generated light be efficiently extracted or confined, the refractive index of the optical materials used therein is an important factor. The aforementioned optical devices require microprocessing into thin layers and complex shapes, and polymers such as photoresists are suitable as polymers applied to such optical devices.

Patent Document 1: Japanese Patent Application Laid-open No. H9-221598

DISCLOSURE OF THE INVENTION

In order to solve the above-mentioned problems, an object of the present invention is to provide a method for easily producing a composite of a polymer and tungstic acid and/or molybdic acid, and a composite having high transparency and a desired refractive index obtained according to that method.

With the foregoing in view, an example of a method for modulating the refractive index in a polymer consists of introducing a halogen atom, sulfur atom or an aromatic ring into the constituent elements of the polymer as previously described. According to this method, a single, transparent substance is obtained that can be mass-produced. On the other hand, this method also has problems in terms of difficulty in accommodating molecular design, difficulty in enhancing functions other than refractive index, deterioration over time and susceptibility to the occurrence of refractive index anisotropy.

In addition, an example of a method for modulating refractive index by using a composite consisting of a polymer and metal oxide fine particles consists of mixing a polymer with metal oxide fine particles having a different refractive index from that of the polymer and dispersing the metal oxide fine particles in the polymer. According to this method, the functionality of the polymer used can be maintained, and the modulation range of the refractive index thereof can be adjusted arbitrarily. On the other hand, in the case of using this method, there are shortcomings such as difficulty in uniformly dispersing the metal oxide fine particles in the polymer and being unable to apply the method to certain polymers depending on the properties of the polymer used.

In order to solve the above-mentioned problems, the inventor of the present invention unexpectedly found that an acid such as phosphotungstic acid, which was conventionally thought to be insoluble in organic solvent, easily dissolves in a specific solvent such as ethyl acetate or methanol. It was also found that a composite obtained by distilling off or solidifying a solvent from a solution obtained by dissolving a polymer that dissolves in the same solvent in an acid such as phosphotungstic acid, or a film composed of that composite, has high transparency and has an arbitrary refractive index corresponding to the content of the phosphotungstic acid and the like.

Moreover, the inventor of the present invention found that the product of immersing a polymer in the form of a molded film in a solution of phosphotungstic acid and the like has similarly high transparency and has an arbitrary refractive index corresponding to the content of the phosphotungstic acid and the like.

With the foregoing in view, the present invention provides a method for easily producing a composite of a polymer and tungstic acid and/or molybdic acid, and a composite obtained according to that method in which the function of the constituent polymer is maintained and has high transparency and a desired refractive index.

Furthermore, the having of high transparency as referred to in the present invention means that transparency at a specific wavelength inherently retained by the polymer does not significantly decrease, or in other words, has a low transmittance reduction rate, even after having formed a composite with tungstic acid and/or molybdic acid. The attaining of such a low transmittance reduction rate was difficult in the prior art due to the presence of metal salts in the form of fine particles.

Namely, the present invention is as described below.

[1] A composite containing one or more types of acids selected from tungstic and molybdic acids, and a polymer having one or more bonds selected from ether bonds and ester bonds and having a number average molecular weight of 1,000 to 10,000,000, wherein the content of the one or more types of acids selected from tungstic and molybdic acids in the composite is 0.01% by weight to 95% by weight.

[2] The composite described in [1], wherein the weight ratio of the total amount of the polymer and the one or more types of acids selected from tungstic and molybdic acids in the composite is 90% by weight or more.

[3] The composite described in [1] or [2], wherein the polymer is one or more types selected from;
a polymer obtained by polymerizing one or more types of compounds selected from compounds represented by the following formula (I) and multifunctional acrylates having two or more functional groups, this polymer having one or more bonds selected from ester bonds and ether bonds, and polysaccharides and derivatives thereof:

[Chemical Formula I]

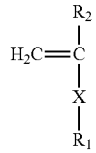

(I)

(where, X represents a single bond or a linking group represented by —O—, —COO—, —OCO—, —CONR₃— or —NHCO—, R₁ and R₃ respectively and independently represent a hydrogen atom, an alkyl group having 1 to 18 carbon atoms in which an arbitrary hydrogen may be substituted with a hydroxyl group or an alkenyl group having 1 to 18 carbon atoms, an aryl group having 6 to 18 carbon atoms in which an arbitrary hydrogen may be substituted with a methyl group, an aralkyl group having 7 to 18 carbon atoms, a heterocyclic group having 3 to 18 carbon atoms, an alicyclic hydrocarbon group having 3 to 18 carbon atoms, polyethylene oxide having a degree of polymerization of 2 to 20 or a glycidyl group, R₂ represents a hydrogen atom or a methyl group, and R₁ and R₃ may be linked through an ether bond).

[4] The composite described in [3], wherein the compound represented by formula (I) is one or more types selected from methyl (meth)acrylate, butyl (meth)acrylate, norbornyl (meth)acrylate, benzyl (meth)acrylate, (meth)acrylic acid, 2-hydroxyethyl (meth)acrylate, styrene and vinyl acetate.

[5] The composite described in [3], wherein the multifunctional acrylate having two or more functional groups in a molecule thereof is one or more types selected from methylenebisacrylamide, ethylene glycol di(meth)acrylate, hexanediol di(meth)acrylate, decanediol di(meth)acrylate, polyethylene glycol di(meth)acrylate, dipentaerythritol hexa(meth)acrylate, dipentaerythritol penta(meth)acrylate, dipentaerythritol tetra(meth)acrylate, dipentaerythritol tri(meth)acrylate, pentaerythritol tetra(meth)acrylate, pentaerythritol tri(meth)acrylate and trimethylolpropane tri(meth)acrylate.

[6] The composite described in [1] or [2], wherein the polymer is one or more types selected from poly(methyl (meth)acrylate), poly(meth)acrylic acid, polyvinyl acetate, polyvinyl alcohol, poly(styrene-co-polymethyl methacrylate), poly(2-hydroxyethyl methacrylate) and cellulose triacetate.

[7] The composite described in any of [1] to [6], which is in the form of particles or a film.

[8] The composite described in any of [1] to [7], wherein the transmittance reduction rate of the composite is 10% or less.

[9] A method for producing a composite of one or more types of acids selected from tungstic and molybdic acids and a raw material containing a polymer, the method including:
a step for obtaining a solution by dissolving one or more types of compounds selected from heteropoly acids of tungstic acid and salts thereof and heteropoly acids of molybdic acid and salts thereof and a raw material containing a polymer having one or more bonds selected from ether bonds and ester bonds and having a number average molecular weight of 1,000 to 10,000,000, in a solvent composed of one or more types of compounds selected from organic compounds which have one hydroxyl group and/or 1 to 3 carbonyl groups, have a molecular weight of 34 to 300, have a boiling point at normal pressure of 250° C. or lower and which are a liquid at normal temperature; and a step for distilling off the solvent from the solution.

[10] The method described in [9], wherein the raw material contains a polymer that is obtained by polymerizing one or more types of compounds selected from compounds represented by the following formula (I) and has one or more bonds selected from t ester bonds and ether bonds:

[Chemical Formula 2]

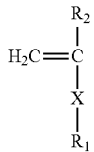

(I)

(where, X represents a single bond or a linking group represented by —O—, —COO—, —OCO—, —CONR₃— or —NHCO—, R₁ and R₃ respectively and independently represent a hydrogen atom, an alkyl group having 1 to 18 carbon atoms in which an arbitrary hydrogen may be substituted with a hydroxyl group or an alkenyl group having 1 to 18 carbon atoms, an aryl group having 6 to 18 carbon atoms in which an arbitrary hydrogen may be substituted with a methyl group, an aralkyl group having 7 to 18 carbon atoms, a heterocyclic group having 3 to 18 carbon atoms, an alicyclic hydrocarbon group having 3 to 18 carbon atoms, a polyethylene oxide having a degree of polymerization of 2 to 20 or a glycidyl group, R₂ represents a hydrogen atom or methyl group, and R₁ and R₃ may be linked through an ether bond).

[11] The method described in [9] or [10], wherein the polymer is one or more types selected from poly(methyl (meth)acrylate), poly(meth)acrylic acid and polyvinyl acetate.

[12] The method described in any of [9] to [11], wherein the step for distilling off the solvent from the solution is carried out on a base material coated with the solution.

[13] The method described in any of [9] to [12], wherein the solvent is one or more types of compounds selected from ester-based compounds, alcohol-based compounds, ketone-based compounds, lactone-based compounds, glycol monoether monoester-based compounds, and glycol diester-based compounds.

[14] The method described in any of [9] to [13], wherein the solvent is one or more types selected from methanol and ethanol.

[15] The method described in any of [9] to [14], containing a step for granulating the solution implemented between the step for obtaining the solution and the step for distilling off the solvent from the solution.

[16] A method for producing a composite of one or more types of acids selected from tungstic and molybdic acids and a raw material containing a water-soluble polymer, the method comprising: a step for obtaining a solution by dissolving one or more types of compounds selected from heteropoly acids of tungstic acid and salts thereof and a raw material containing the water-soluble polymer, in one or more types of solvent selected from water and alcohol-based compounds; and a step for distilling off the solvent from the solution.

[17] The production method described in [16], wherein the water-soluble polymer is polyvinyl alcohol.

[18] The method described in [16] or [17], wherein the step for granulating the solution is contained between the step for obtaining the solution and the step for distilling off the solvent from the solution.

[19] A method for producing a composite of one or more types of acids selected from tungstic and molybdic acids and a raw material containing a polymer, 
the method including: a step for obtaining a first solution by dissolving one or more types of compounds selected from heteropoly acids of tungstic acid and salts thereof and heteropoly acids of molybdic acid and salts thereof in a solvent composed of one or more types of compounds selected from organic compounds which have one hydroxyl group and/or 1 to 3 carbonyl groups, have a molecular weight of 34 to 300, have a boiling point at normal pressure of 250° C. or lower and which are a liquid at normal temperature; a step for obtaining a second solution by dissolving a raw material containing a polymer having one or more bonds selected from ether bonds and ester bonds and having a number average molecular weight of 1,000 to 10,000,000 in a solvent composed of one or more types of compounds selected from alkyl halides having 1 to 3 carbon atoms and cyclic ethers; a step for mixing the first solution and the second solution; and, a step for distilling off the solvent from the resulting mixed solution.

[20] The production method described in [19], wherein the solvent that composes the first solution is one or more types selected from ester-based compounds and alcohol-based compounds, the solvent that composes the second solution is one or more types selected from dichloromethane and trichloromethane, and the polymer is a polysaccharide or derivative thereof.

[21] The production method described in [20], wherein the polysaccharide or derivative thereof is cellulose triacetate.

[22] The method described in any of [19] to [21], including a step for granulating a solution after mixing implemented between the step for obtaining the solutions, the step for mixing the first solution and the second solution, and the step for distilling off the solvent from the resulting mixed solution.

[23] A method for producing a composite composed of one or more types of acids selected from tungstic and molybdic acids and a polymer of a polymerizable compound, the method including: a step for obtaining a solution by dissolving one or more types of compounds selected from heteropoly acids of tungstic acid and salts thereof and heteropoly acids of molybdic acid and salts thereof in a solvent in the form of the polymerizable compound; and, a step for polymerizing the polymerizable compound in the solution.

[24] The method described in [23], wherein the polymerizable compound is a compound selected from compounds represented by the following formula (I), vinyl ketone-based compounds and glycidyl ester-based compounds:

[Chemical Formula 3]

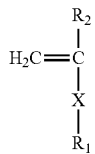

(I)

(where, X represents a single bond or a linking group represented by —O—, —COO—, —OCO—, —CONR$_3$— or —NHCO—, R$_1$ and R$_3$ respectively and independently represent a hydrogen atom, an alkyl group having 1 to 18 carbon atoms in which an arbitrary hydrogen may be substituted with a hydroxyl group or an alkenyl group having 1 to 18 carbon atoms, an aryl group having 6 to 18 carbon atoms in which an arbitrary hydrogen may be substituted with a methyl group, an aralkyl group having 7 to 18 carbon atoms, a heterocyclic group having 3 to 18 carbon atoms, an alicyclic hydrocarbon group having 3 to 18 carbon atoms, a polyethylene oxide having a degree of polymerization of 2 to 20 or a glycidyl group, R$_2$ represents a hydrogen atom or methyl group, and R$_1$ and R$_3$ may be linked through an ether bond).

[25] The method described in [24], wherein the polymerizable compound is a compound represented by formula (I).

[26] The method described in any of [23] to [25], including a step for granulating the solution implemented between the step for obtaining the solution and the step for polymerizing the polymerizable compound in the solution.

[27] A method for producing a composite of one or more types of acids selected from tungstic and molybdic acids and a raw material containing a polymer, the method including: a step for obtaining a solution by dissolving one or more types of compounds selected from heteropoly acids of tungstic acid and salts thereof and heteropoly acids of molybdic acid and salts thereof in a solvent composed of one or more types of compounds selected from organic compounds which have one hydroxyl group and/or 1 to 3 carbonyl groups, have a molecular weight of 34 to 300, have a boiling point at normal pressure of 250° C. or lower and which are a liquid at normal temperature; a step for immersing a polymer having one or more types of bonds selected from ether bonds and ester bonds and having a number average molecular weight of 1,000 to 10,000,000 in the solution; and, a step for distilling off the solvent from the solution following immersion.

[28] The production method described in [27], wherein the polymer is a compound represented by the following formula (I) and the solvent is an alcohol-based compound:

[Chemical Formula 4]

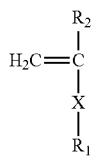

(I)

(where, X represents a single bond or a linking group represented by —O—, —COO—, —OCO—, —CONR$_3$— or —NHCO—, R$_1$ and R$_3$ respectively and independently represent a hydrogen atom, an alkyl group having 1 to 18 carbon atoms in which an arbitrary hydrogen may be substituted with a hydroxyl group or an alkenyl group having 1 to 18 carbon atoms, an aryl group having 6 to 18 carbon atoms in which an arbitrary hydrogen may be substituted with a methyl group, an aralkyl group having 7 to 18 carbon atoms, a heterocyclic group having 3 to 18 carbon atoms, an alicyclic hydrocarbon group having 3 to 18 carbon atoms, polyethylene oxide having a degree of polymerization of 2 to 20 or a glycidyl group, $R_2$ represents a hydrogen atom or methyl group, and $R_1$ and $R_3$ may be linked through an ether bond).

[29] The method described in [27] or [28], wherein the polymer is in the form of particles or a film.

[30] A composite obtained according to the production method described in any of [9] to [29].

According to the present invention, in addition to providing a production method for easily obtaining a composite of a polymer and tungstic acid and/or molybdic acid, a composite produced according to that method can be provided that has high transparency and a desired refractive index.

MODE FOR CARRYING OUT THE INVENTION

Figure 1:
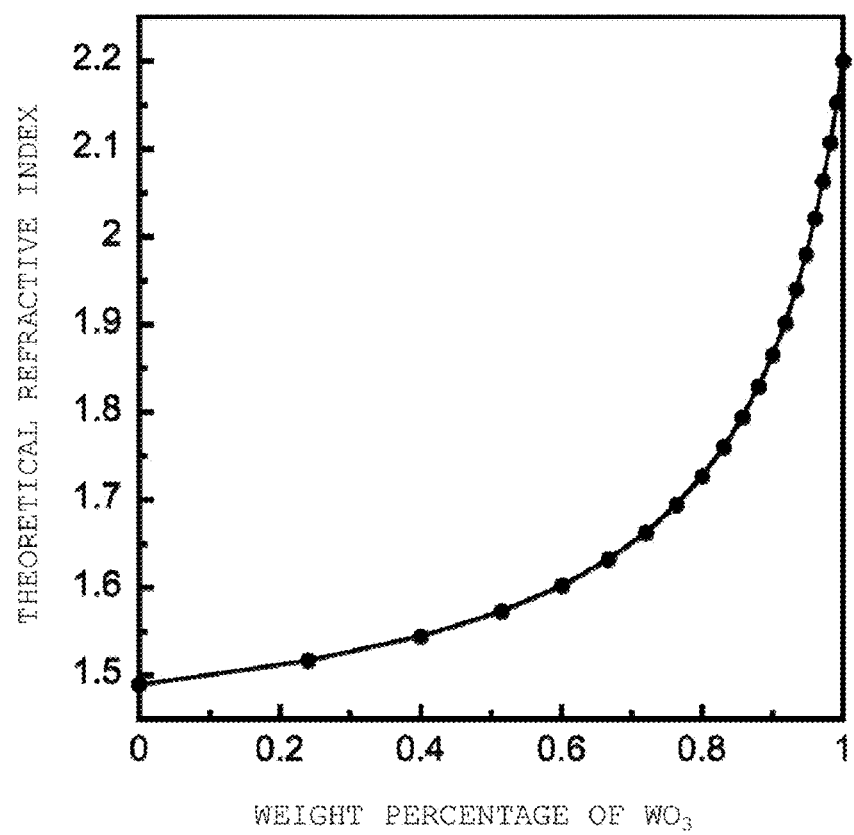
FIG. 1 is a drawing indicating the relationship between the content of tungstic acid and refractive index (theoretical value) in a composite.

The composite of the present invention is a composite containing one or more types of acids selected from tungstic and molybdic acids and a polymer having one or more bonds selected from ether bonds and ester bonds and having a number average molecular weight of 1,000 to 10,000,000, wherein the content of the one or more types of acids selected from tungstic and molybdic acids in the composite is 0.01% by weight to 95% by weight.

In the composite of the present invention, the one or more types of acids selected from tungstic and molybdic acids are not present as particles, but rather the composite of the present invention forms a solid solution. Furthermore, a solid solution as referred to in the present invention refers to that in which tungstic acid and the like are not present in the form of particles, but rather are present uniformly in the composite.

<Tungstic Acid and Molybdic Acid>

Tungstic acid and/or molybdic acid are present in the composite of the present invention at 0.01% by weight to 95% by weight based on the total amount of the composite.

The state in which they are present is thought to be such that they are present at a nearly uniform ratio in the composite.

Furthermore, in the present invention, tungstic acid refers to tungsten trioxide ($WO_3$), while molybdic acid refers to molybdenum trioxide ($MoO_3$).

The weight percentages of tungstic acid and molybdic acid in the composite can be determined by measuring the residual weight ratio when heated to 550° C. in the presence of oxygen using a thermogravimetry/differential thermal analyzer (TG-DTA).

The content of the one or more types of acids selected from tungstic and molybdic acids in the composite of the present invention is 0.01% by weight to 95% by weight. This weight percentage is preferably 80% by weight or less from the viewpoint of optical transmittance of a film obtained from the composite.

As a result of the composite of the present invention having such a weight percentage, refractive index can be adjusted to a desired refractive index while obtaining favorable optical transmittance of a composite obtained in the form of a film.

In the composite of the present invention, the content of tungstic acid and molybdic acid can be adjusted by adjusting the concentration of one or more types of heteropoly acid salts selected from tungstic and molybdic acids that are dissolved in a solvent in the method for producing a composite to be subsequently described.

Tungstic acid and molybdic acid may each be contained independently in the composite or two types thereof may be contained.

In the case of containing two types of tungstic acid and molybdic acid in the composite, an example of a mode thereof is that in which they are contained at a molar ratio of tungstic acid:molybdic acid of 1:9 to 9:1.

<Polymer>

The polymer contained in the raw material that composes the composite of the present invention is a polymer having one or more bonds selected from ether bonds and ester bonds and having a number average molecular weight of 1,000 to 10,000,000.

Furthermore, the ratio of the above-mentioned polymer having one or more bonds selected from ether bonds and ester bonds and having a number average molecular weight of 1,000 to 10,000,000 contained in the raw material that composes the composite of the present invention is normally 20% by weight or more, preferably 30% by weight or more and particularly preferably 50% by weight or more based on the total amount of polymer in the composite.

As a result of having one or more bonds selected from ether bonds and ester bonds and having the above-mentioned number average molecular weight, the polymer can be dissolved in the above-mentioned solvent and tungstic acid and/or molybdic acid are finely and uniformly present in the composite formed, thereby demonstrating transparency.

The number average molecular weight of the above-mentioned polymer is more preferably 2,000 to 5,000,000 and even more preferably 5,000 to 3,000,000 from the viewpoints of favorable handling during composite production in addition to solubility in solvent to be subsequently described and transparency of a film composed of the resulting composite.

The polymer that composes the composite of the present invention is more preferably a polymer that is obtained by polymerizing one or more types of compounds selected from compounds represented by the following formula (I) and polyfunctional acrylates having two or more functional groups, and has one or more bonds selected from ester bonds and ether bonds.

When a polymer is used that is obtained by polymerizing one or more types of compounds selected from compounds represented by the following formula (I) and multifunctional acrylates having two or more functional groups and has an ether bond or ester bond in a molecule thereof, since this polymer is able to form a complex with metal ions, the above-mentioned tungstic acid and the like is uniformly present in the composite.

Number average molecular weight as referred to in the present invention refers to the molecular weight based on polystyrene as determined by gel permeation chromatography (GPC).

[Chemical Formula 5]

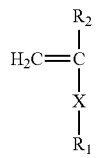

(I)

(In formula (I), X represents a single bond or a linking group represented by —O—, —COO—, —OCO—, —CONR$_3$— or —NHCO—, R$_1$ and R$_3$ respectively and independently represent a hydrogen atom, an alkyl group having 1 to 18 carbon atoms in which an arbitrary hydrogen may be substituted with a hydroxyl group or alkenyl group having 1 to 18 carbon atoms or an aryl group having 6 to 18 carbon atoms in which an arbitrary hydrogen may be substituted with a methyl group, an aralkyl group having 7 to 18 carbon atoms, a heterocyclic group having 3 to 18 carbon atoms, an alicyclic hydrocarbon group having 3 to 18 carbon atoms, a polyethylene oxide having a degree of polymerization of 2 to 20 or a glycidyl group, R$_2$ represents a hydrogen atom or methyl group, and R$_1$ and R$_3$ may be linked through an ether bond.)

Examples of compounds represented by the above-mentioned formula (I) include (meth)acrylic acid, (meth)acrylic acid esters (to be generically referred to as (meth)acrylic acid-based compounds), vinyl ethers and vinyl esters.

Furthermore, in the present invention, "(meth)acrylic acid" is the generic term for acrylic acid and methacrylic acid, and refers to either one or both.

Examples of (meth)acrylic acid esters include aliphatic hydrocarbon esters (such as alkyl esters having 1 to 18 carbon atoms) of (meth)acrylic acid such as methyl (meth)acrylate, ethyl (meth)acrylate, n-propyl (meth)acrylate, n-butyl (meth)acrylate, isobutyl (meth)acrylate, n-pentyl (meth)acrylate, n-hexyl (meth)acrylate, n-heptyl (meth)acrylate, n-octyl (meth)acrylate, 2-hydroxyethyl (meth)acrylate, 2-ethylhexyl (meth)acrylate, nonyl (meth)acrylate, decyl (meth)acrylate, dodecyl (meth)acrylate or stearyl (meth)acrylate;
alicyclic hydrocarbon (meth)acrylate such as cyclohexyl (meth)acrylate, (meth)norbornyl acrylate, and (meth)isobornyl acrylate; aromatic hydrocarbon esters of (meth)acrylic acid such as phenyl (meth)acrylate or toluyl (meth)acrylate; and aralkyl esters of (meth)acrylic acid such as benzyl (meth)acrylate.

Examples of vinyl ethers include methyl vinyl ether, ethyl vinyl ether, cyclohexyl vinyl ether, hydroxyethyl vinyl ether and hydroxybutyl vinyl ether.

Examples of vinyl esters include vinyl acetate, vinyl propionate and vinyl cinnamate.

Among compounds represented by formula (I), the use of (meth)acrylic acid or a (meth)acrylic acid ester is preferable from the viewpoint of solubility of the resulting polymer in solvent.

Among (meth)acrylic acid esters, methyl (meth)acrylate, butyl (meth)acrylate, 2-hydroxyethy (meth)acrylate, norbornyl (meth)acrylate, benzyl (meth)acrylate and vinyl acetate are preferable from the viewpoint of cost and availability.

Other examples of compounds represented by formula (I) are (meth)acrylamide derivatives.

Examples of (meth)acrylamide derivatives include (meth)acrylamide, N-substituted lower alkyl (meth)acrylamides in which the alkyl moiety has 1 to 5 carbon atoms, N-substituted aryl (meth)acrylamides in which the aryl moiety has 6 to 18 carbon atoms, N-substituted aralkyl (meth)acrylamides in which the aralkyl moiety has 7 to 18 carbon atoms and N-substituted heterocyclic (meth)acrylamides in which the heterocyclic moiety has 4 to 5 carbon atoms. Specific examples of N-substituted lower alkyl (meth)acrylamides include N-ethyl (meth)acrylamide, N, N-dimethyl (meth)acrylamide and N-isopropyl (meth)acrylamide, while specific examples of the above-mentioned N-substituted heterocyclic (meth)acrylamides include N-acryloylmorpholine.

Among these (meth)acrylamide derivatives, N,N-dimethylacrylamide, N-acryloylmorpholine and N-isopropylacrylamide are used preferably.

In addition, examples of compounds represented by formula (I) also include glycidyl (meth)acrylate in which R$_1$ in formula (I) is a glycidyl group.

Other examples of compounds represented by formula (I) include styrene-based compounds in which X in formula (I) represents a single bond and R$_1$ represents a phenyl group in which an arbitrary hydrogen may be substituted with a methyl group. Specific examples of styrene-based compounds include styrene, α-methylstyrene, o-methylstyrene, m-methylstyrene and p-methylstyrene. Among these, styrene is used preferably. Instead of polymerizing alone, these styrene-based compounds are preferably used as raw materials of a composite by copolymerizing with a compound for forming a polymer having one or more bonds selected from ether bonds and ester bonds as previously described or by mixing with a polymer obtained from a compound for forming a polymer having one or more bonds selected from ether bonds and ester bonds as previously described.

Specific examples of polyfunctional acrylates containing two or more (meth)acryloyl groups in a molecule thereof include methylenebisacrylamide, ethylene glycol di(meth)acrylate, hexanediol di(meth)acrylate, decanediol di(meth)acrylate, polyethylene glycol di(meth)acrylate, dipentaerythritol hexa(meth)acrylate, dipentaerythritol penta(meth)acrylate, dipentaerythritol tetra(meth)acrylate, dipentaerythritol tri(meth)acrylate, pentaerythritol tetra(meth)acrylate, pentaerythritol tri(meth)acrylate and trimethylolpropane tri(meth)acrylate, as well as alkyl-modified (meth)acrylates, caprolactone-modified (meth)acrylates, ethylene oxide-modified (meth)acrylates or propylene oxide-modified (meth)acrylates of the above-mentioned compounds, and (meth)acrylates of aliphatic polyols other than those described above. In addition, examples also include tris((meth)acryloyloxyethyl)isocyanurates and caprolactone-modified tris((meth)acryloyloxyethyl)isocyanurates.

Among these, ethylene glycol dimethacrylate, dipentaerythritol hexamethacrylate and trimethylolpropane trimethacrylate are preferable.

<Polymerization Method>

Among polymers that compose the composite of the present invention, a polymer that is obtained by polymerizing one or more types of compounds selected from compounds represented by the above-mentioned formula (I) and multifunctional acrylates having two or more functional groups, and has one or more bonds selected from ester bonds and ether bonds, can be obtained by selecting one or more types of compounds selected from compounds represented by the above-mentioned formula (I) and multifunctional acrylates having two or more (meth)acryloyl groups in a molecule thereof that at least form ester bonds or ether bonds in a molecule thereof followed by their (co)polymerization.

A polymer obtained by suitably combining and polymerizing the above-mentioned compounds may be that used as a resist material.

Examples of the polymerization method include known methods, and for example, radical polymerization, cationic polymerization or anionic polymerization can be used corresponding to the monomers used.

Among polymers obtained with the above-mentioned polymerization method, poly(methyl (meth)acrylate), poly(butyl (meth)acrylate), poly(norbornyl (meth)acrylate), poly(benzyl (meth)acrylate) and polyvinyl acetate are used particularly preferably. Furthermore, among the above-mentioned polymers, polyvinyl acetate that has been converted to polyvinyl alcohol by carrying out saponification treatment after obtaining by polymerization can be used preferably. Moreover, polyethylene glycol having a number average molecular weight within the above-mentioned range can also be used as a polymer in addition those listed above.

Furthermore, a water-soluble polymer as referred to in the present invention refers to a polymer having solubility in water such that 0.5 g or more dissolve in 100 g of water at 40° C. In the present invention, a polymer that satisfies this requirement is referred to as a water-soluble polymer. Among the above-mentioned polymers, preferable examples of water-soluble polymers include polyvinyl alcohol and polyethylene glycol. An example of the average molecular weight of this polyvinyl alcohol is 13,000 to 440,000, and this average molecular weight can be determined by gel permeation chromatography (GPC). In addition, an example of the degree of saponification of this polyvinyl alcohol is 30 mol % to 99.5 mol %. The degree of saponification can be determined by a titration method.

Examples of the above-mentioned polymers used in the present invention include polysaccharides and derivatives thereof.

Although examples of such polysaccharides include cellulose, amylose, β-1,4-chitosan, chitin, β-1,4-mannan, β-1,4-xylan, inulin, α-1,3-glucan, β-1,3-glucan (curdlan, schizophyllan), pullulan, dextran, glucomannan, amylopectin, agarose, cyclodextrin (including α-, β- and γ-cyclodextrin) and cyclosophorose, cellulose, amylose, β-1,4-xylan, β-1,3-glucan and cyclodextrin are preferable since they allow highly pure polysaccharides to be obtained easily.

In addition, examples of derivatives thereof include carbamate derivatives that have formed a urethane bond, ester derivatives that have formed an ester bond, and ether derivatives that have formed an ether bond.

Among these, ester derivatives are preferable from the viewpoint of solubility in solvent to be subsequently described, and in particular, ester derivatives of cellulose are preferable and fatty acid cellulose esters are particularly preferable.

Fatty acid cellulose esters refer to compounds in which all or a portion of the hydroxyl groups of cellulose have been esterified by fatty acid, and examples thereof include cellulose esters such as cellulose acetate, cellulose acetate propionate, cellulose acetate butyrate, cellulose acetate phthalate or cellulose nitrate. Among these, cellulose acetate, cellulose acetate propionate and cellulose acetate butyrate are preferable, and cellulose acetate is particularly useful.

Among these cellulose acetates, cellulose triacetate is particularly preferable. On the other hand, those in which the number of ester bonds composed of fatty acid and hydroxyl groups possessed by the glucose unit of cellulose is 1 to 2.9 on average, or in other words the degree of substitution is 1 to 2.9, can be used preferably.

The polymer used in the present invention can use a homopolymer that uses a single monomer, can use a copolymer using a plurality of monomers, or can be used by mixing a plurality of those polymers or copolymers. In the case of using a plurality of polymers, the polymers can be mixed at an arbitrary ratio that does not impair transparency of the resulting composite.

Specific examples of combinations include copolymers using a plurality of monomers, such as copolymers obtained by copolymerizing methyl (meth)acrylate and styrene, copolymers obtained by copolymerizing (meth)acrylic acid and 2-hydroxymethyl acrylate, and copolymers obtained by copolymerizing ethylene and vinyl acetate.

On the other hand, in the case of using a plurality of polymers, specific examples include combinations of poly(methyl methacrylate) and polyvinyl acetate, combinations of poly(2-hydroxyethyl methacrylate) and polyvinyl alcohol, combinations of poly(methyl methacrylate) and polystyrene, and combinations of polyvinyl acetate and poly(2-hydroxyethyl methacrylate).

Furthermore, an additive such as a plasticizer, antioxidant or photostabilizer may be added to the above-mentioned polymer as necessary.

In the composite of the present invention, the above-mentioned polymer and the tungstic acid or molybdic acid are present in a form such that the tungstic acid or molybdic acid are uniformly present in the composite without using another special material. The weight ratio of the total amount of polymer, tungstic acid and the like in the composite of the present invention is preferably 90% by weight or more, more preferably 92% by weight or more, and particularly preferably 95% by weight or more.

<Method for Producing Composite and Film>

A first method for producing the composite of the present invention comprises a step for obtaining a solution by dissolving a raw material containing one or more types of compounds selected from heteropoly acids of tungstic acid and salts thereof and heteropoly acids of molybdic acid and salts thereof, and a polymer having one or more bonds selected from ether bonds and ester bonds and having a number average molecular weight of 1,000 to 10,000,000, in a solvent composed of an organic compound having one hydroxyl group and/or 1 to 3 carbonyl groups, having a molecular weight of 34 to 300, having a boiling point at normal pressure of 250° C. or lower and which is a liquid at normal temperature; and, a step for distilling off the above-mentioned solvent from the above-mentioned solution.

The polymer used in the first production method is one or more types of polymers selected from a polymer having one or more bonds selected from ether bonds and ester bonds and which is obtained by polymerizing one or more types of compounds selected from compounds represented by the above-mentioned formula (I) and multifunctional acrylates having two or more functional groups and polysaccharides and derivatives thereof.

Specific examples polymers used in the first method for producing the composite of the present invention that are compounds represented by the above-mentioned formula (I) include the above-mentioned (meth)acrylic acid-based compounds such as (meth)acrylic acid and (meth)acrylic acid esters, (meth)acrylamide derivatives such as N,N-dimethacrylamide, styrene-based compounds such as styrene, and compounds obtained by polymerizing one or more types of compounds selected from multifunctional acrylates having two or more (meth)acryloyl groups such as ethylene glycol (meth)acrylate (polymers of a single monomer or copolymers of a plurality of monomers). Any polymer can be used that is able to be dissolved in the solution in which tungstic acid and the like are dissolved.

A second method for producing the composite of the present invention comprises a step for obtaining a solution by dissolving a raw material containing one or more types of compounds selected from heteropoly acids of tungstic acid and salts thereof and heteropoly acids of molybdic acid and salts thereof and a water-soluble polymer in one or more types of solvent selected from water and alcohol-based compounds; and, a step for distilling off the above-mentioned solvent from the above-mentioned solution.

According to the second method, a water-soluble polymer can be used for the polymer that composes the composite.

An example of a water-soluble polymer is polyvinyl alcohol.

A third method for producing the composite of the present invention comprises a step for obtaining a first solution by dissolving one or more types of compounds selected from heteropoly acids of tungstic acid and salts thereof and heteropoly acids of molybdic acid and salts thereof in a solvent composed of one or more types of compounds selected from organic compounds having one hydroxyl group and/or 1 to 3 carbonyl groups, having a molecular weight of 34 to 300, having a boiling point at normal pressure of 250° C. or lower and which are a liquid at normal temperature; a step for obtaining a second solution by dissolving a raw material containing a polymer having one or more bonds selected from ether bonds and ester bonds and having a number average molecular weight of 1,000 to 10,000,000 in a solvent composed of one or more types of compounds selected from alkyl halides having 1 to 3 carbon atoms and cyclic ethers; and, a step for mixing the first solution and the second solution and distilling off the solvent from the resulting mixed solution.

According to the third method, as a result of using a specific solvent for the solvent for preparing the second solution that differs from that of the first solution, a polysaccharide-based polymer can be used for the polymer that composes the composite.

A fourth method for producing the composite of the present invention comprises a step for obtaining a solution by dissolving one or more types of compounds selected from heteropoly acids of tungstic acid and salts thereof and heteropoly acids of molybdic acid and salts thereof in a solvent in the form of the polymerizable compound; and, a step for polymerizing the polymerizable compound in the solution.

According to the fourth production method, the above-mentioned polymerizable compound can be used as solvent, and a composite with tungstic acid and the like can be produced by polymerization thereof.

Examples of polymerizable compounds include compounds represented by the above-mentioned formula (I). Among these, compounds listed as examples in the above-mentioned first production method can be used preferably.

A fifth method for producing the composite of the present invention comprises a step for obtaining a solution by dissolving one or more types of compounds selected from heteropoly acids of tungstic acid and salts thereof and heteropoly acids of molybdic acid and salts thereof in a solvent composed of one or more types of compounds selected from organic compounds having one hydroxyl group and/or 1 to 3 carbonyl groups, having a molecular weight of 34 to 300, having a boiling point at normal pressure of 250° C. or lower and which are a liquid at normal temperature; a step for immersing a polymer having one or more bonds selected from ether bonds and ester bonds and having a number average molecular weight of 1,000 to 10,000,000 in the solution; and, a step for distilling off the solvent from the solution following immersion.

According to the fifth method, a superior composite can be obtained by a simple procedure consisting of impregnating a polymer preliminarily molded into the form of a film and the like with a solution of tungstic acid and the like. Although there are no particular limitations thereon, the duration of impregnation is normally 0.5 hours to 48 hours.

The same polymers as those used in the previously described first to fourth steps can be used for the polymer used in the fifth step.

<Solvent>

The solvent used in the first method for producing the composite of the present invention is a solvent that dissolves the above-mentioned heteropoly acids of tungstic acid and salts thereof and heteropoly acids of molybdic acid and salts thereof and dissolves the above-mentioned polymer.

The solvent used in the second method for producing the composite of the present invention is an organic compound having one hydroxyl group or 1 to 3 carbonyl groups, having a molecular weight of 34 to 300, having a boiling point at normal pressure of 250° C. or lower and which is a liquid at normal temperature. This organic compound is able to favorably dissolve the above-mentioned polymer corresponding to the type thereof.

Examples of such organic compounds include non-polymerizable compounds and polymerizable compounds.

Examples of non-polymerizable compounds include ester-based compounds, alcohol-based compounds, ketone-based compounds, lactone-based compounds, glycol monoether monoester-based compounds, glycol diester-based compounds and amide-based compounds.

The solvent used in the second method for producing the composite of the present invention is one or more types selected from alcohol-based compounds used in the above-mentioned first production method and water. An alcohol-based compound or water is preferably used alone. In the case of mixing an alcohol-based compound and water, the weight ratio thereof is normally 1:9 to 9:1.

Furthermore, distilled water is preferably used for the water from the viewpoint of enhancing the purity thereof.

The solvent used in the third method for producing the composite of the present invention can be the same solvent as that used in the above-mentioned first production method to prepare the above-mentioned first solution, and examples of solvents used to prepare the above-mentioned second solution include one or more solvents selected from alkyl halides having 1 to 3 carbon atoms and cyclic ethers.

The solvent used in the fourth method for producing the composite of the present invention can use the previously described polymerizable compounds, more preferably uses a compound represented by the above-mentioned formula (I), and particularly preferably uses (meth)acrylic acid-based compounds such as methyl (meth)acrylate, (meth)acrylic acid and 2-hydroxyethyl methacrylate, vinyl acetate, or (meth)acrylamide derivatives in the manner N,N-dimethyl-acrylamide.

The solvent used in the fifth method for producing the composite of the present invention can use a solvent used in the above-mentioned first production method, and an alcohol-based compound is used preferably.

Examples of the above-mentioned ester-based compounds include methyl formate, ethyl formate, butyl formate, methyl acetate, ethyl acetate, propyl acetate, butyl acetate, amyl acetate, benzyl acetate, ethyl propionate, isobutyl isobutyrate, ethyl isovalerate and butyl stearate. Among these, ethyl acetate, butyl acetate, ethyl propionate and isobutyl isobutyrate are particularly preferable since they are inexpensive. Such an ester-based compound, and particularly preferably ethyl acetate, is used preferably to dissolve a polymer among the above-mentioned polymers that does not dissolve in the following alcohol-based compounds. Moreover, this is also used preferably to dissolve phosphotungstic acid and phosphomolybdic acid.

Examples of the above-mentioned alcohol-based compounds include methanol, ethanol, 1-propanol and 2-propanol.

These alcohol-based compounds are preferably used to dissolve (meth)acrylic acid esters among the above-mentioned polymers. Moreover, these are also preferably used to dissolve phosphotungstic acid and phosphomolybdic acid.

Examples of the above-mentioned ketone-based compounds include aliphatic ketones and alicyclic ketones, examples of aliphatic ketones include acetone, methyl ethyl ketone, methyl propyl ketone, diethyl ketone, methyl n-butyl ketone, methyl isobutyl ketone, 2-heptanone, 4-heptanone, diisobutyl ketone, acetonylacetone and 2-octanone, and examples of alicyclic ketones include cyclohexanone and methyl cyclohexanone.

These ketone-based compounds are preferably used to dissolve the above-mentioned polysaccharides and derivatives thereof, and particularly ester derivatives.

Examples of lactone-based compounds include α-acetolactone, β-propiolactone, γ-butyrolactone and δ-valerolactone.

Examples of glycol diester-based compounds include ethylene glycol diacetate and propylene glycol diacetate.

Examples of glycol ester ether-based compounds include ethylene glycol monomethyl ether acetate, diethylene glycol monomethyl ether acetate, diethyleneglycolmonobutyletheracetate and propylene glycol monomethyl ether acetate.

Examples of amide-based compounds include dimethylacetoamide and methylpyrrolidone.

Examples of the alkyl halides having 1 to 3 carbon atoms include dichloromethane, trichloromethane and tetrachloromethane.

These alkyl halides are preferably used to dissolve the above-mentioned polysaccharides or derivative thereof, and particularly ester derivatives.

Tetrahydrofuran (THF) is preferably used as cyclic ether, and other cyclic ethers mainly composed of THF can be used in combination therewith. For example, 3-membered cyclic ethers such as ethylene oxide, propylene oxide, isobutylene oxide or epichlorohydrin, four-membered cyclic ethers such as oxetane, 3,3-dimethyloxetane, 3-methyloxetane or 3,3-bis(chloromethyl) oxetane, or five-membered cyclic ethers such as methyltetrahydrofuran or 1,3-dioxolane, may be used in combination.

A plurality of the above-mentioned non-polymerizable compounds used as solvent in the present invention may also be mixed before use. Examples of such mixtures include a mixture of an ester-based compound and an alcohol-based compound, and a specific example thereof consists of using ethyl acetate for the ester-based compound and using methanol or ethanol for the alcohol-based compound. At that time, the weight ratio of the ester-based compound and alcohol-based compound is preferably 9:1 to 2:8 from the viewpoint of reliably dissolving the above-mentioned polymer and the above-mentioned tungstic acid and the like.

In addition, among the above-mentioned organic compounds, examples of polymerizable compounds include compounds represented by the above-mentioned formula (I), vinyl ketone-based compounds and glycidyl ester-based compounds.

Specific examples of compounds represented by the above-mentioned formula (I) include (meth)acrylic acid esters such as (meth)acrylic acid and 2-hydroxyethyl methacrylate, vinyl ethers and vinyl esters.

The same compounds as those used when polymerizing the above-mentioned polymer can be used for these compounds.

Examples of vinyl ester-based compounds include vinyl acetate, vinyl benzoate, vinyl propionate, vinyl octanoate, vinyl hexenoate, vinyl dodecanoate and vinyl behenate.

Examples of vinyl ketone-based compounds include alkyl ketones in which the alkyl moiety has 1 to 10 carbon atoms, and specific examples thereof include methyl vinyl ketone, ethyl vinyl ketone, isopropyl vinyl ketone, butyl vinyl ketone and t-butyl vinyl ketone. In addition, other examples include divinyl ketone, phenyl vinyl ketone, methyl isopropenyl ketone, isopropenyl vinyl ketone and isopropenyl phenyl ketone.

Examples of glycidyl ester-based compounds include glycidyl acrylate, glycidyl methacrylate, glycidyl ethacrylate and glycidyl itaconate.

Examples of heteropoly acids of tungstic acid and molybdic acid respectively include phosphotungstic acid, silicotungstic acid, phosphomolybdic acid and silicomolybdic acid. These heteropoly acids may also be used in the form of hydrates, and hydrates may be used after dehydrating by heat treatment. In addition, examples of heteropoly acid salts include potassium, sodium and ammonium salts of the above-mentioned heteropoly acids.

In the method for producing the composite of the present invention, phosphotungstic acid is preferably used for the heteropoly acid based on its solubility in solvent.

Among the methods used to produce the composite of the present invention, in the above-mentioned first and second production methods, a solution can be obtained by simultaneously dissolving the above-mentioned polymer and one or more types of compounds selected from the above-mentioned heteropoly acids of tungstic acid and molybdic acid and salts thereof (to also simply be referred to as "tungstic acid and the like") in the above-mentioned solvent, or a solution can be obtained by mixing a solution obtained by preliminarily dissolving a raw material containing the above-mentioned polymer in the above-mentioned solvent with a solution obtained by dissolving the above-mentioned tungstic acid and the like in the above-mentioned solvent to obtain a solution of the above-mentioned materials. For example, a solution of the above-mentioned materials can be obtained by dissolving the above-mentioned polymer in an ester-based solvent such as ethyl acetate, dissolving tungstic acid and the like in an alcohol-based solvent such as methanol, and mixing the solutions.

The composite of the present invention can then be obtained by distilling off the above-mentioned solvent from the solution obtained by going through this procedure. Examples of methods used to distill of the solvent include solvent distillation by drying or reduced pressure.

Furthermore, in the above-mentioned first and third production methods, the ratio of the above-mentioned polymer having one or more bonds selected from ether bonds and ester bonds and having a number average molecular weight of 1,000 to 10,000,000 in the raw material containing the polymer is normally 70% by weight or more, preferably 80% by weight or more, and particularly preferably 90% by weight or more. Here, the above-mentioned raw material may contain a plurality of the above-mentioned polymers.

In addition, examples of other compounds contained in the raw material containing the above-mentioned polymer include polymers other than those having one or more bonds selected from ether bonds and ester bonds and having a number average molecular weight of 1,000 to 10,000,000, and examples thereof include styrene-based resins and known surfactants.

The above-mentioned polymer, such as a polymer obtained from a compound represented by formula (I), and a polycarbonate resin can be mixed for use as a mode in which a plurality of polymers are contained in the raw material. The polycarbonate resin is a polymer obtained by a phosgene method in which various dihydroxydiaryl compounds are reacted with phosgene, or a transesterification method in which a dihydroxydiaryl compound is reacted with a carbonic acid ester such as diphenyl carbonate, and typical examples thereof include polycarbonate resins produced from 2,2-bis(4-hydroxyphenyl)propane (bisphenol A). Examples of the above-mentioned polymers combined with such a polycarbonate resin include polymers obtained by polymerizing a compound represented by the above-mentioned formula (I), and a preferable example thereof is a polymer obtained by polymerizing a (meth)acrylic acid-based compound.

Although there are no particular limitations on the ratio of the polycarbonate resin and a polymer obtained by polymerizing a compound represented by the above-mentioned formula (I) or a polymer obtained by polymerizing a (meth) acrylic acid-based compound, an example thereof is a ratio of 1 or more based on a value of 1 for the polycarbonate resin from the viewpoint of transparency of the composite.

Furthermore, in the above-mentioned methods for producing a composite, in the case of simultaneously dissolving the raw material containing polymer and the tungstic acid and the like in the above-mentioned solvent, the concentrations of the polymer and tungstic acid and the like in the solvent are adjusted to concentrations of about 1% by weight to 15% by weight and about 0.1% by weight to 15% by weight, respectively.

On the other hand, in the case of preliminarily preparing a solution of the above-mentioned polymer and a solution of the above-mentioned tungstic acid and the like separately, the concentration of the polymer is adjusted to about 5% by weight to 20% by weight and the concentration of tungstic acid and the like is adjusted to about 10% by weight to 80% by weight in each solution.

In the case of using a plurality of polymers, the plurality of polymers can be mixed favorably by adding an organic amine such as dicyclohexylamine or an inorganic base such as sodium hydroxide to the polymer solution. For example, such abase is used preferably in the case of mixing an acrylic acid-based polymer and a polystyrene-based polymer.

The solvents used in the solution of the above-mentioned polymer and the solution of the above-mentioned tungstic acid and the like may be the same or different. For example, water, alcohol-based compound, ketone-based compound, specific alkyl halide or cyclic ether can be used for the solvent used in the solution of the above-mentioned polymer corresponding to the type of polymer, and an ester-based compound, alcohol-based compound or water can be used for the solvent used in the solution of the above-mentioned tungstic acid and the like.

In the case of using the above-mentioned polymerizable compounds as solvent, by preparing a solution by dissolving the above-mentioned tungstic acid and the like in the above-mentioned polymerizable compound and polymerizing the polymerizable compound in the solution, a composite is obtained of the above-mentioned tungstic acid and the like and a polymer obtained by polymerizing the above-mentioned polymerizable compound.

The ratio of the above-mentioned tungstic acid and the like to the above-mentioned polymerizable compound used as solvent is normally adjusted so that the amount of tungstic acid and the like in the solution is 10% by weight to 95% by weight.

A known method can be used to polymerize the above-mentioned polymerizable compound in the solution, and examples thereof include radical polymerization, cationic polymerization and anionic polymerization.

Photopolymerization can also be used for the polymerization method, and a known photopolymerization initiator can be used at that time.

Furthermore, an additive such as a plasticizer, antioxidant or photostabilizer may be added as necessary during polymerization of the above-mentioned polymerizable compound.

The above-mentioned polymerizable compound used as solvent is preferably a compound selected from compounds represented by the above-mentioned formula (I), vinyl ketone-based compounds and glycidyl ester-based compounds.

Among these, a compound represented by the above-mentioned formula (I) is used preferably, and a (meth) acrylic acid-based compound such as methyl (meth)acrylate, (meth)acrylic acid or 2-hydroxyethyl methacrylate, vinyl acetate, or (meth)acrylamide derivative a such as N,N-dimethylacrylamide, is used particularly preferably.

The film of the present invention is composed of the above-mentioned composite of the present invention, and can be produced by distilling off solvent from a solution containing the above-mentioned composite. A uniform film can be obtained by distilling off the solvent after coating the solution onto a substrate, thereby making this preferable.

The film thickness of the film is normally 0.05 µm to 100 µm.

Although there are no particular limitations on the method used to coat a solution containing the composite of the present invention onto a substrate, examples thereof include spin coating, roll coating, slit coating, dipping, spray coating, gravure coating, reverse coating, rod coating, bar coating, die coating, kiss coating, reverse kiss coating, air knife coating and curtain coating.

Examples of the coated substrate include transparent glass substrates such as white sheet glass, blue sheet glass, silica-coated blue sheet glass, quartz glass, sapphire glass or single crystal sapphire, synthetic resin sheets such as those made of polycarbonate, polyester, acrylic resin, vinyl chloride resin, aromatic polyamide resin, polyamide-imide or polyimide, metal sheets such as those made of aluminum, copper, nickel or stainless steel, and other substrates such as those made of ceramic, silicon, GaN, SiN, SiC or GaAs.

Drying is an example of a method used to distill off the solvent from the coated solution, and the drying procedure can be preferably carried out in an environment at room temperature to 300° C. and more preferably at room temperature to 250° C. at which the polymer does not deteriorate, and drying may also be carried out under reduced pressure (such as at $1\times10^{-6}$ kPa to 100 kPa).

The composite of the present invention may be subjected to annealing treatment after forming. Annealing in the present invention refers to treatment consisting of holding the molded composite at a suitable temperature (for example, 50° C. to 200° C.) for a prescribed amount of time (for example, 5 minutes to 120 minutes) followed by cooling slowly.

Hardness, moisture resistance and solvent resistance of the composite can be enhanced by carrying out this annealing treatment. This effect is more remarkably obtained in the case of using a water-soluble polymer or a polymer that dissolves in an alcohol-based compound for the above-mentioned polymer.

In addition to being able to be used as a film as previously described, the composite of the present invention can also be used as a base material composed of an inorganic material such as PET or other plastic or glass, or as an adhesive for adhering a base material composed of metal and the like, by using in the form of a solution obtained by dissolving the composite in a suitable solvent or as a solution in which the above-mentioned composite has been formed.

As a result, when producing a multi-layer material by laminating a plurality of transparent base materials having different refractive indices, for example, the refractive index thereof can be adjusted to a desired refractive index.

Another example of a mode of the composite of the present invention is that in which it is in the form of spherical particles (to be referred as particulate) in addition to being in the form of a film as previously described.

In a mode in which the composite of the present invention is particulate as well, the composite demonstrates superior transparency and refractive index can be adjusted to a desired range.

In this particulate mode, particles can be obtained in which the diameter able to be confirmed with a scanning electron microscope is 0.2 µm to 50 µm, or those having a diameter of about 200 µm can be obtained by suitably varying the conditions when granulating the particles.

Examples of methods used to produce a particulate composite include the method indicated below.

In the above-mentioned first to third production methods, a particulate composite can be obtained following a step for obtaining a solution, in which tungstic acid and the like and polymer are dissolved, by distilling off the solvent from the granulated particles by going through a step for granulating the solution.

An example of such a step is a suspension polymerization method. A surfactant may also be used in the suspension polymerization method.

A specific example of a procedure for carrying out suspension polymerization is as indicated below.

In the step for granulating the solution, the solution is dropped into a solvent in which the solution is insoluble followed by stirring.

An example of a step for distilling off the solvent following granulation is a method by which it is carried out by drying under reduced pressure.

In the first, second, third and fourth production methods, an example of a solvent in which the solution obtained by dissolving the tungstic acid and the like and the above-mentioned polymer is insoluble is silicone oil.

A commercially available product can be used for the silicone oil, and the silicone oil used can be unmodified or modified.

Examples of unmodified silicone oil that can be used include methyl silicone oil, dimethyl silicone oil, methylphenyl silicone oil and cyclic dimethyl silicone oil.

Examples of modified silicone oil include both end-type, one end-type, side chain-type and side chain, side-chain both end-type silicone oil.

In the third production method, a highly polar solvent such as water, for example, can be used for the solvent in which the solution obtained by dissolving tungstic acid and the like and the above-mentioned polymer is insoluble.

In the fourth production method, a composite is obtained by polymerizing a granulation product by going through a step for obtaining a solution obtained by dissolving the tungstic acid and the like and a polymerizable compound followed by a step for granulating the solution. An example of a method used to polymerize the granulation product consists of a method that is carried out while heating in a solvent in which the granulation product is dispersed. Following polymerization, residual solvent and the like is distilled off by drying under reduced pressure.

Suspension polymerization is an example of such a method. An arbitrary additive can be used during suspension polymerization.

Determining the transmittance reduction rate of a composite is used as a method for expressing transparency of the composite of the present invention.

Transmittance reduction rate expresses the rate of reduction of transmittance as a percentage based on transmittance at a specific wavelength (600 nm) of the polymer alone in which the content of tungstic acid and the like is 0% by weight (refer to the equation below).

$$\text{Transmittance reduction rate (\%)} = (T_0 - T_1)/T_0 \times 100$$

$T_0$=transmittance of polymer alone (%)
$T_1$=transmittance of composite containing tungstic acid and the like (%)

In the composite of the present invention, the transmittance reduction rate at the above-mentioned specific wavelength is 30% or less and 10% or less in a preferable mode thereof. Moreover, in the composite of the present invention, another example of a mode thereof is that in which the transmittance reduction rate at the above-mentioned specific wavelength is 5% or less.

In the case the composite of the present invention is in a particulate mode, the function of desired refractive index of the composite can be imparted to a dispersing polymer by dispersing the particulate composite in a polymer having low compatibility with the polymer that forms the composite.

For example, in the case of using poly(meth)acrylic acid for the polymer that composes the composite and using polycarbonate for the dispersing polymer, a desired refractive index can be imparted to the polycarbonate resin.

The following provides a detailed explanation of the present invention with reference to examples. However, the present invention is not limited to the following examples.

Example 1

Composite and Film Production

Poly(methyl methacrylate) having a number average molecular weight of 120,000 was dissolved in ethyl acetate to prepare a 10% by weight solution of poly(methyl methacrylate), and phosphotungstic acid 30-hydrate ($H_3[PW_{12}O_{40}] \cdot nH_2O$, n≈30, Mw: 3421 (theoretical value of 30-hydrate), WO$_3$ content: 81 mol %) was dissolved in ethyl acetate to prepare a 40% by weight solution of phosphotungstic acid.

Both of the resulting solutions were mixed to prepare mixed solutions having phosphotungstic acid contents of 0% by weight to 92% by weight based on the total amount of composite formed. At this time, in the case a solution became cloudy, methanol was added to make it transparent.

As a result of dropping 100 μL of the prepared mixed solution onto white sheet glass followed by spin-coating under conditions of 1000 rpm and 20 seconds, a composite of poly(methyl methacrylate) and phosphotungstic acid was able to be formed and a film composed of that composite was able to be produced.

Examples 2 to 4

Measurement of Refractive Index

An ethyl acetate solution of phosphotungstic acid (26.5% by weight) and poly(methyl methacrylate) (8.7% by weight) (weight percentage of phosphotungstic acid: 71% by weight (68.6% by weight as the amount of tungstic acid) was prepared according to the same procedure as Example 1. 300 μL of this solution were cast on a glass substrate measuring 2.5 cm×2.5 cm followed by spin-coating at a rotating speed of 500 rpm, 1000 rpm or 2000 rpm to produce films having three types of film thicknesses (Example 2: 5.75 μm, Example 3: 3.97 μm, Example 4: 2.73 μm).

The refractive index of each of the resulting films was measured at a wavelength of 633 nm based on a value 1.52 for the refractive index of the glass substrate using a prism coupler (SPA-4000, Sairon Technology, Inc.). The results are shown in Table 1.

Furthermore, in Table 1, theoretical values of the refractive indices were calculated in accordance with the following equation (1). The values indicated below were used for the densities and refractive indices of tungstic acid and poly(methyl methacrylate).

TABLE 1

| Film Formation Conditions | Refractive Index (measured) | Refractive Index (theoretical) | Film Thickness (μm) |
|---|---|---|---|
| 500 rpm | 1.6614 | 1.658 | 5.75 |
| 1000 rpm | 1.6628 | 1.658 | 3.97 |
| 2000 rpm | 1.6614 | 1.658 | 2.73 |

[Equation 1]

$$\frac{n^2-1}{n^2+2} = (1-c)\frac{\rho}{\rho_1}\frac{n_1^2-1}{n_1^2+2} + c\frac{\rho}{\rho_2}\frac{n_2^2-1}{n_2^2+2} \quad (1)$$

n: refractive index of mixture, $n_1$, $n_2$: refractive indices of components 1 and 2, ρ: density of mixture, $\rho_1$, $\rho_2$: densities of components 1 and 2, c: weight percentage of component 2

Density of tungstic acid (WO$_3$): 7.150, refractive index: 2.050

Density of poly(methyl methacrylate): 1.190, refractive index: 1.489

Based on the results of Table 1, the theoretical values and measured values of refractive index closely agreed. As a result, tungstic acid was presumed to be uniformly present in the film.

In addition, a graph indicating the relationship between theoretical refractive index and tungstic acid content (wt %) is shown in FIG. 1.

Examples 5 to 13

Measurement of Transmittance

Each of the films was produced according to the same procedure as Example 1 while changing the content (wt %) of phosphotungstic acid in the ethyl acetate solution so that the content of phosphotungstic acid based on the total amount of composite formed was 16% by weight (Example 5), 27% by weight (Example 6), 42% by weight (Example 7), 66% by weight (Example 8), 70% by weight (Example 9), 76% by weight (Example 10), 80% by weight (Example 11), 90% by weight (Example 12) or 92% by weight (Example 13), respectively.

In addition, films were also produced to serve as reference examples by preparing so as to have phosphotungstic acid contents (wt %) of 0% by weight and 100% by weight.

Figure 2:
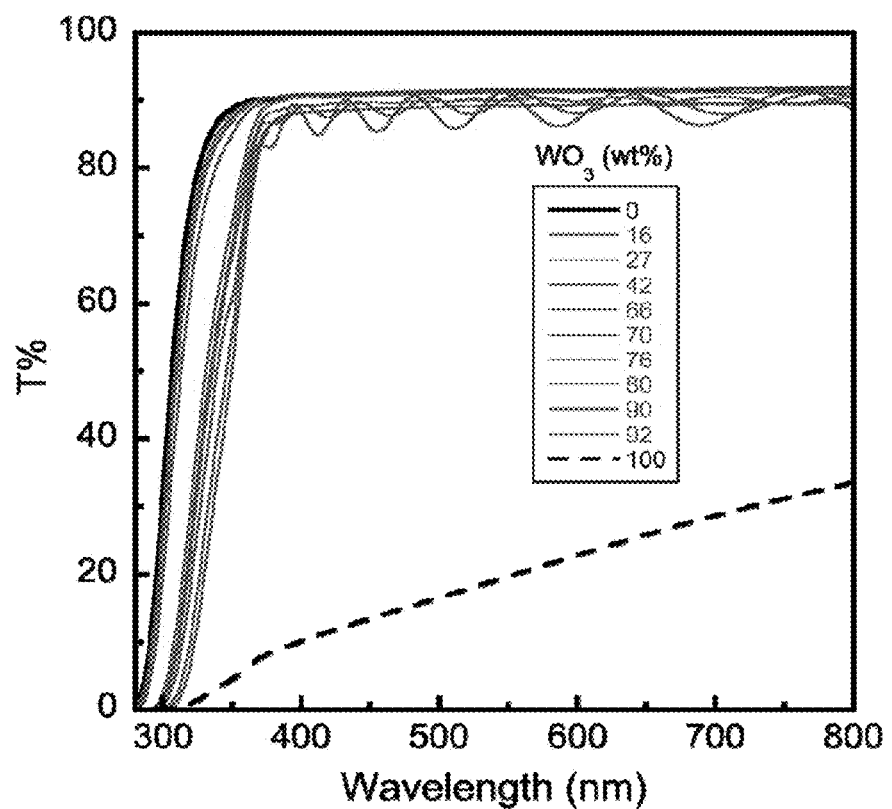
FIG. 2 is a drawing representing optical transmittance of a composite (film) of the present invention.
Figure 3:
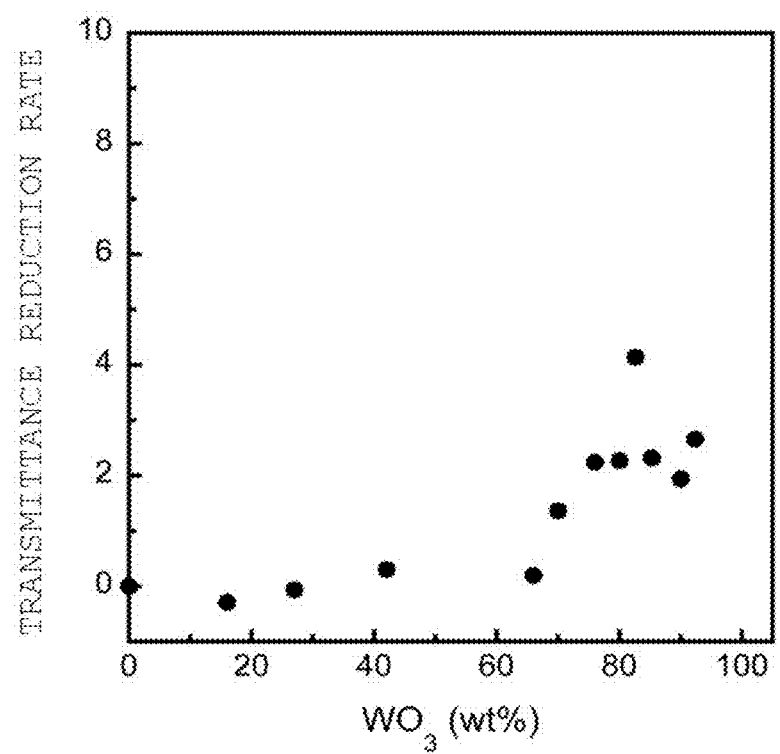
FIG. 3 is a drawing indicating the relationship between the content of tungstic acid and transmittance reduction rate in a composite of the present invention (composite of poly(methyl methacrylate) and phosphotungstic acid of Example 1 (film having a film thickness of 5 μm)).
Figure 4:
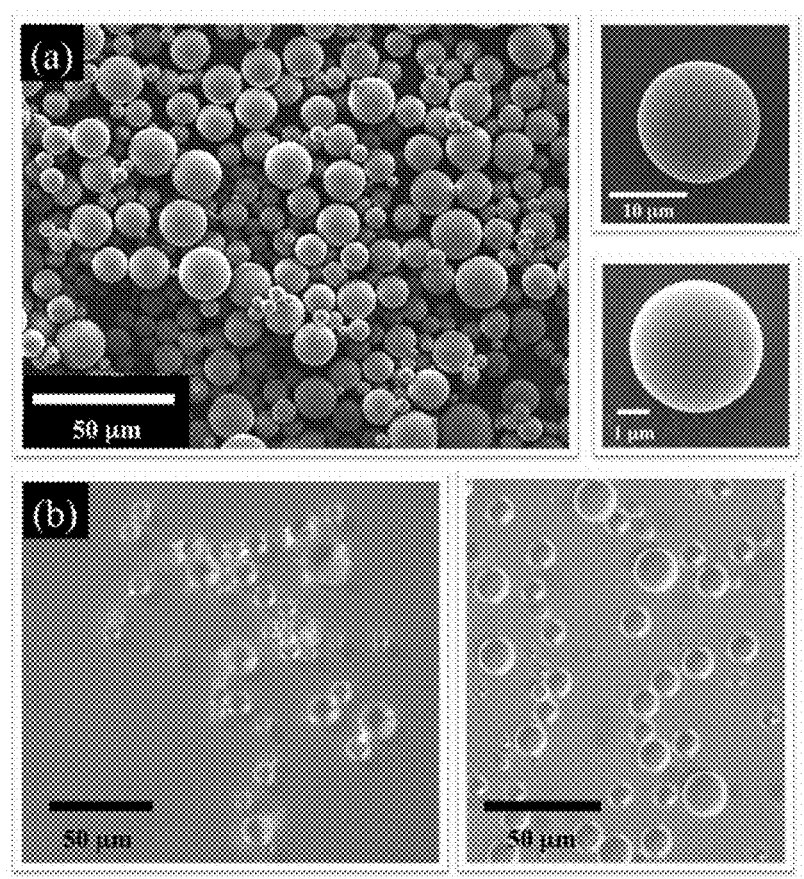
FIG. 4 shows a scanning electron micrograph (a) and an optical photomicrograph (b) of a composite of the present invention (particulate composite of poly(methyl methacrylate) and phosphotungstic acid of Example 36).

Transmittance was measured for each film using an ultraviolet-visible spectrophotometer (V-560, Jasco Corp.). The results are shown in FIG. 2.

Example 14

Example Using Copolymer as Polymer

Polystyrene-co-poly(methyl methacrylate) having a number average molecular weight of 150,000 (polystyrene content: 40 mol %) was dissolved in ethyl acetate to prepare a 10% by weight solution, and phosphotungstic acid 30-hydrate (H$_3$[PW$_{12}$O$_{40}$].nH$_2$O, n≈30, Mw: 3421 (theoretical value of 30-hydrate), WO$_3$ content: 81 mol %) was dissolved in ethyl acetate to prepare a 40% by weight solution of phosphotungstic acid.

Both of the resulting solutions were mixed to prepare a mixed solution having a phosphotungstic acid content of 50% by weight based on the total amount of composite formed (48.3% by weight as the amount of tungstic acid). Since the solution became cloudy at that time, methanol was added to make the solution transparent.

As a result of dropping 100 μL of the prepared mixed solution onto white sheet glass followed by spin-coating under conditions of 1000 rpm and 20 seconds, a composite of polystyrene-co-poly(methyl methacrylate) and phosphotungstic acid was able to be formed and a film composed of that composite was able to be produced.

Furthermore, a composite obtained by spin-coating directly without adding methanol to the cloudy solution was also transparent.

Example 15

Example Using Mixture of Polymers as Polymer-1

Poly(methyl methacrylate) having a number average molecular weight of 120,000 and polyvinyl acetate having a number average molecular weight of 100,000 were dissolved in ethyl acetate at a mixing ratio of 1:1 to prepare a 10% by weight solution (poly(methyl methacrylate): 5% by weight, polyvinyl acetate: 5% by weight), and phosphotungstic acid 30-hydrate (H$_3$[PW$_{12}$O$_{40}$].nH$_2$O, n≈30, Mw: 3421 (theoretical value of 30-hydrate), WO$_3$ content: 81 mol %) was dissolved in ethyl acetate to prepare a 40% by weight solution of phosphotungstic acid.

Both of the resulting solutions were mixed to prepare a mixed solution having a phosphotungstic acid content of 50% by weight based on the total amount of composite formed (48.3% by weight as the amount of tungstic acid).

As a result of dropping 100 μL of the prepared mixed solution onto white sheet glass followed by spin-coating under conditions of 1000 rpm and 20 seconds, a composite of poly(methyl methacrylate), polyvinyl acetate and phosphotungstic acid was able to be formed and a film composed of that composite was able to be produced.

Example 16

Example Using Mixture of Polymers as Polymer-2

Poly(2-hydroxyethyl methacrylate) having a number average molecular weight of 300,000 was dissolved in methanol to prepare a 10% by weight solution, polyvinyl alcohol having a number average molecular weight of 25,000 was dissolved in distilled water to prepare a 1% by weight solution, and phosphotungstic acid 30-hydrate ($H_3[PW_{12}O_{40}] \cdot nH_2O$, n≅30, Mw: 3421 (theoretical value of 30-hydrate), $WO_3$ content: 81 mol %) was dissolved in methanol to prepare a 40% by weight solution of phosphotungstic acid.

The resulting three types of solutions were mixed to prepare a mixed solution such that the poly(2-hydroxyethyl methacrylate) and polyvinyl alcohol were mixed at a mixing ratio of 2:1 and the phosphotungstic acid content was 40% by weight based on the total amount of composite formed (38.6% by weight as the amount of tungstic acid).

As a result of dropping 100 μL of the prepared mixed solution onto white sheet glass followed by spin-coating under conditions of 1000 rpm and 20 seconds, a composite of poly(2-hydroxyethyl methacrylate), polyvinyl alcohol and phosphotungstic acid was able to be formed and a film composed of that composite was able to be produced.

Example 17

Example Using Polysaccharide Derivative as Polymer

Cellulose triacetate was dissolved in dichloromethane to prepare a 3% by weight solution, and phosphotungstic acid 30-hydrate ($H_3[PW_{12}O_{40}] \cdot nH_2O$, n≅30, Mw: 3421 (theoretical value of 30-hydrate), $WO_3$ content: 81 mol %) was dissolved in methanol to prepare a 40% by weight solution of phosphotungstic acid.

Both of the resulting solutions were mixed to prepare a mixed solution having a phosphotungstic acid content of 60% by weight based on the total amount of composite formed (58.0% by weight as the amount of tungstic acid).

As a result of dropping 300 μL of the prepared mixed solution onto white sheet glass and allowing to air-dry, a composite of cellulose triacetate and phosphotungstic acid was able to be formed and a film composed of that composite was able to be produced.

Example 18

Example Using Water-Soluble Polymer as Polymer-1

Polyvinyl alcohol having a number average molecular weight of 25,000 was dissolved in distilled water to prepare a 1% by weight solution, and phosphotungstic acid 30-hydrate ($H_3[PW_{12}O_{40}] \cdot nH_2O$, n≅30, Mw: 3421 (theoretical value of 30-hydrate), $WO_3$ content: 81 mol %) was dissolved in distilled water to prepare a 40% by weight solution of phosphotungstic acid.

Both of the resulting solutions were mixed to prepare a mixed solution having a phosphotungstic acid content of 50% by weight based on the total amount of composite formed (48.3% by weight as the amount of tungstic acid).

As a result of dropping 100 μL of the prepared mixed solution onto white sheet glass followed by spin-coating under conditions of 3000 rpm and 40 seconds, a composite of polyvinyl alcohol and phosphotungstic acid was able to be formed and a film composed of that composite was able to be produced.

Example 19

Example Using Water-Soluble Polymer as Polymer-2

Polyacrylic acid having a number average molecular weight of 25,000 was dissolved in methanol to prepare a 10% by weight solution, and phosphotungstic acid 30-hydrate ($H_3[PW_{12}O_{40}] \cdot nH_2O$, n≅30, Mw: 3421 (theoretical value of 30-hydrate), $WO_3$ content: 81 mol %) was dissolved in methanol to prepare a 40% by weight solution of phosphotungstic acid.

Both of the resulting solutions were mixed to prepare a mixed solution having a phosphotungstic acid content of 50% by weight based on the total amount of composite formed (48.3% by weight as the amount of tungstic acid).

As a result of dropping 100 μL of the prepared mixed solution onto white sheet glass followed by spin-coating under conditions of 1000 rpm and 20 seconds, a composite of polyacrylic acid and phosphotungstic acid was able to be formed and a film composed of that composite was able to be produced.

Example 20

Example Using Water-Soluble Polymer as Polymer-3

Poly(2-hydroxyethyl methacrylate) having a number average molecular weight of 300,000 was dissolved in methanol to prepare a 10% by weight solution, and phosphotungstic acid 30-hydrate ($H_3[PW_{12}O_{40}] \cdot nH_2O$, n≅30, Mw: 3421 (theoretical value of 30-hydrate), $WO_3$ content: 81 mol %) was dissolved in methanol to prepare a 40% by weight solution of phosphotungstic acid (at that time, the phosphotungstic acid 30-hydrate was used after dehydrating by heat treatment).

Both of the resulting solutions were mixed to prepare mixed solutions such that the phosphotungstic acid content was 10% by weight, 25% by weight, 40% by weight, 50% by weight, 60% by weight, 75% by weight and 88% by weight, respectively, based on the total amount of composite formed (9.7% by weight, 24.2% by weight, 38.6% by weight, 48.3% by weight, 58.0% by weight, 72.5% by weight or 85.0% by weight, respectively, as the amount of tungstic acid).

As a result of dropping 100 μL of each prepared mixed solution onto white sheet glass followed by spin-coating under conditions of 1000 rpm and 20 seconds, composites of poly(2-hydroxyethyl methacrylate) and phosphotungstic acid were able to be formed and films composed of those composites were able to be produced.

Example 21

Example Using Water-Soluble Polymer as Polymer-4

Polyethylene glycol having a number average molecular weight of 5,000 was dissolved in methanol to prepare a 10% by weight solution, and phosphotungstic acid 30-hydrate ($H_3[PW_{12}O_{40}]\cdot nH_2O$, $n \approx 30$, Mw: 3421 (theoretical value of 30-hydrate), $WO_3$ content: 81 mol %) was dissolved in methanol to prepare a 40% by weight solution of phosphotungstic acid.

Both of the resulting solutions were mixed to prepare a mixed solution having a phosphotungstic acid content of 60% by weight based on the total amount of composite formed (58.0% by weight as the amount of tungstic acid).

As a result of dropping 100 μL of the prepared mixed solution onto white sheet glass followed by spin-coating under conditions of 1000 rpm and 20 seconds, a composite of polyethylene glycol and phosphotungstic acid was able to be formed and a film composed of that composite was able to be produced.

Example 22

Resin Mixing System

<Poly(Methyl Methacrylate)/Polystyrene Mixed System>

Phosphotungstic acid 30-hydrate ($H_3[PW_{12}O_{40}]\cdot nH_2O$, $n \approx 30$, Mw: 3421 (theoretical value of 30-hydrate), $WO_3$ content: 81 mol %) was dissolved in ethyl acetate to prepare a 40% by weight solution of phosphotungstic acid. Dicyclohexylamine was added to this ethyl acetate solution of phosphotungstic acid to a molar ratio of 1:1 and mixed therewith. A mixed ethyl acetate solution containing poly (methyl methacrylate) having a number average molecular weight of 120,000 at 7.5% by weight and polystyrene having a number average molecular weight of 400,000 at 2.5% by weight was added thereto to prepare a mixed solution such that the phosphotungstic acid content was 50% by weight based on the total amount of composite formed (48.3% by weight as the amount of tungstic acid).

As a result of dropping 300 μL of the prepared mixed solution onto white sheet glass and allowing to air-dry, a composite of poly(methyl methacrylate), polystyrene, dicyclohexylamine and phosphotungstic acid was able to be formed and a film composed of that composite was able to be produced. The resulting composite film demonstrated transparency.

Example 23

System Using Dimethylacetoamide as Solvent (Amide-Based Solvent)

Poly(methyl methacrylate) having a number average molecular weight of 120,000 and phosphotungstic acid 30-hydrate ($H_3[PW_{12}O_{40}]\cdot nH_2O$, $n \approx 30$, Mw: 3421 (theoretical value of 30-hydrate), $WO_3$ content: 81 mol %) were dissolved in dimethylacetoamide to prepare solutions containing each at 5% by weight. These solutions were then added to prepare a mixed solution so that the phosphotungstic acid content based on the total amount of composite formed was 50% by weight (48.3% by weight as the amount of tungstic acid).

As a result of dropping 200 μL of the prepared mixed solution onto white sheet glass and allowing to air-dry, a composite of poly(methyl methacrylate) and phosphotungstic acid was able to be formed and a film composed of that composite was able to be produced.

Example 24

System Using Methyl Ethyl Ketone as Solvent (Ketone-Based Solvent)

Poly(methyl methacrylate) having a number average molecular weight of 120,000 and phosphotungstic acid 30-hydrate ($H_3[PW_{12}O_{40}]\cdot nH_2O$, $n \approx 30$, Mw: 3421 (theoretical value of 30-hydrate), $WO_3$ content: 81 mol %) were dissolved in methyl ethyl ketone to prepare solutions containing each at 5% by weight. These solutions were then added to prepare a mixed solution so that the phosphotungstic acid content based on the total amount of composite formed was 50% by weight (48.3% by weight as the amount of tungstic acid).

As a result of dropping 200 μL of the prepared mixed solution onto white sheet glass and allowing to air-dry, a composite of poly(methyl methacrylate) and phosphotungstic acid was able to be formed and a film composed of that composite was able to be produced.

Example 25

System Using γ-Butyrolactone as Solvent (Lactone-Based Solvent)

Poly(methyl methacrylate) having a number average molecular weight of 120,000 and phosphotungstic acid 30-hydrate ($H_3[PW_{12}O_{40}]\cdot nH_2O$, $n \approx 30$, Mw: 3421 (theoretical value of 30-hydrate), $WO_3$ content: 81 mol %) were dissolved in γ-butyrolactone to prepare solutions containing each at 5% by weight. These solutions were then added to prepare a mixed solution so that the phosphotungstic acid content based on the total amount of composite formed was 50% by weight (48.3% by weight as the amount of tungstic acid).

As a result of dropping 200 μL of the prepared mixed solution onto white sheet glass and allowing to air-dry, a composite of poly(methyl methacrylate) and phosphotungstic acid was able to be formed and a film composed of that composite was able to be produced.

Example 26

System Using Poly(N-isopropylacrylamide) as Polymer

Poly(N-isopropylacrylamide) and phosphotungstic acid 30-hydrate ($H_3[PW_{12}O_{40}]\cdot nH_2O$, $n \approx 30$, Mw: 3421 (theoretical value of 30-hydrate), $WO_3$ content: 81 mol %) were dissolved in methanol to prepare solutions containing each at 5% by weight. These solutions were then added to prepare a mixed solution so that the phosphotungstic acid content based on the total amount of composite formed was 50% by weight (48.3% by weight as the amount of tungstic acid).

As a result of dropping 200 μL of the prepared mixed solution onto white sheet glass and allowing to air-dry, a composite of poly(N-isopropylacrylamide) and phosphotungstic acid was able to be formed and a film composed of that composite was able to be produced.

Example 27

System Using 2-Ethylhexyl Methacrylate as Solvent: Example Using Polymerizable Compound as Solvent Poly(2-hydroxyethyl methacrylate) having a number average molecular weight of 300,000 and phosphotungstic acid 30-hydrate ($H_3[PW_{12}O_{40}]\cdot nH_2O$, $n \approx 30$, Mw: 3421 (theoretical value of 30-hydrate), $WO_3$ content: 81 mol %) were dissolved in 2-ethylhexyl methacrylate to prepare solutions containing each at 5% by weight. These solutions were then added to prepare a mixed solution so that the phosphotungstic acid content based on the total amount of composite formed was 50% by weight (48.3% by weight as the amount of tungstic acid).

As a result of dropping 300 μL of the prepared mixed solution onto white sheet glass and allowing to air-dry, a composite of poly(2-hydroxyethyl methacrylate) and phosphotungstic acid was able to be formed and a film composed of that composite was able to be produced.

Example 28

System Polymerized with 2-hydroxyethyl Methacrylate

Phosphotungstic acid 30-hydrate ($H_3[PW_{12}O_{40}]\cdot nH_2O$, $n \approx 30$, Mw: 3421 (theoretical value of 30-hydrate), $WO_3$ content: 81 mol %) was dissolved in 2-hydroxyethyl methacrylate to prepare a 50% by weight solution.

As a result of adding a polymerization initiator in the form of azobisisobutyronitrile to the prepared 2-hydroxyethyl methacrylate solution of phosphotungstic acid at 0.5% by weight based on the 2-hydroxyethyl methacrylate and heating for 6 hours at 60° C., a composite of poly(2-hydroxyethyl methacrylate) and phosphotungstic acid was able to be formed and a film composed of that composite was able to be produced. Furthermore, three types of films were produced in which the content of phosphotungstic acid based on the total amount of the composite was 30% by weight, 50% by weight and 70% by weight (29.0% by weight, 48.3% by weight and 67.6% by weight, respectively, as the amount of tungstic acid).

Example 29

System Polymerized with N,N-dimethylacrylamide

Phosphotungstic acid 30-hydrate ($H_3[PW_{12}O_{40}]\cdot nH_2O$, $n \approx 30$, Mw: 3421 (theoretical value of 30-hydrate), $WO_3$ content: 81 mol %) was dissolved in methanol to prepare a 40% by weight solution of phosphotungstic acid.

The prepared methanol solution of phosphotungstic acid was added so that the content of tungstic acid based on the total amount of the composite was 50% by weight (48.3% as the amount of tungstic acid), and a polymerization initiator in the form of azobisisobutyronitrile was added at 0.5% by weight based on N, N-dimethylacrylamide. As a result of heating for 6 hours at 60° C., a composite of poly(N,N-dimethylacrylamide) and phosphotungstic acid was able to be formed and a film composed of that composite was able to be produced.

Examples 30 to 33

Films were able to be produced from composites having a phosphotungstic acid content based on the total amount of composite of 50% by weight (48.3% by weight as the amount of tungstic acid) by using as monomers methyl methacrylate (Example 30), methacrylic acid (Example 31), ethyl acrylate (Example 32) or a mixture (1:1 weight ratio) (Example 33) of methyl methacrylate and 2-hydroxyethyl methacrylate according to the same procedure as Example 29.

Example 34

Example of Polymer/Metal Salt Composite Using Impregnation

Phosphotungstic acid 30-hydrate ($H_3[PW_{12}O_{40}]\cdot nH_2O$, $n \approx 30$, Mw: 3421 (theoretical value of 30-hydrate), $WO_3$ content: 81 mol %) was dissolved in methanol to prepare a 40% by weight solution of phosphotungstic acid. Poly (methyl methacrylate) was immersed in a methanol/water (10:1) solution of the prepared phosphotungstic acid for 1 day at room temperature. As a result of removing from the solution, washing the surface with methanol and drying, a poly(methyl methacrylate)/phosphotungstic acid composite containing 23% by weight of phosphotungstic acid (22.2% by weight as the amount of tungstic acid) was formed (compounding weight was confirmed by thermogravimetric analysis).

Example 35

Production of Particulate Composite: Suspension Evaporation Method 2.7 g of poly(methyl methacrylate) having a number average molecular weight of 120,000, 2.7 g of phosphotungstic acid 30-hydrate ($H_3\cdot[PW_{12}O_{40}]\,nH_2O$, $n \approx 30$, Mw: 3421 (theoretical value of 30-hydrate), $WO_3$ content: 81 mol %), 3.0 g of Monoterminal Silaplane (FM-DA11, Azmax Co.) and 0.5 g of water were dissolved in 25 g of methanol to obtain a composite solution. This composite solution was added to 300 mL of dimethyl silicone oil (KF-968-100CS, Shin-Etsu Chemical Co., Ltd.) followed by granulating by stirring at room temperature for 30 minutes at 300 rpm. Subsequently, the mixture was stirred for 3 hours in an oil bath at 40° C. A composite was then recovered by centrifuging (5000 rpm) the solution followed by washing twice with n-hexane. As a result of drying under reduced pressure, a composite of poly(methyl methacrylate) and phosphotungstic acid was able to be formed and colorless, transparent particles composed of that composite were able to be produced.

Example 36

<Production of Particulate Composite: Suspension Polymerization Method>

2.5 g of methyl methacrylate, 2.5 g of ethylene glycol dimethacrylate, 5.0 g of phosphotungstic acid 30-hydrate ($H_3\cdot[PW_{12}O_{40}]\cdot nH_2O$, $n \approx 30$, Mw: 3421 (theoretical value of 30-hydrate), $WO_3$ content: 81 mol %) and 0.05 g of polymerization initiator in the form of azobisisobutyronitrile were mixed to obtain a composite solution. This composite solution was added to 100 mL of dimethyl silicone oil (KF-968-100CS, Shin-Etsu Chemical Co., Ltd.) followed by granulating by stirring at 40° C. for 6 hours at 250 rpm in the presence of flowing nitrogen gas and then polymerizing. The formed particles were recovered by suction filtering using a glass filter and then washed twice with n-hexane. As a result of drying under reduced pressure, a composite of methyl methacrylate, ethylene glycol dimethacrylate and phosphotungstic acid was able to be formed and colorless, transparent particles composed of that composite were able to be produced.

Example 37

<Production of Composite Using Phosphomolybdic Acid>

Poly(methyl methacrylate) having a number average molecular weight of 120,000 was dissolved in ethyl acetate to prepare a 10% by weight solution, and phosphomolybdic acid hydrate ($H_3[PMo_{12}O_{40}] \cdot nH_2O$, n≅30, Mw: 2366 (theoretical value of 30-hydrate), $MoO_3$ content: 73 mol %) was dissolved in methanol to prepare a 50% by weight solution of phosphomolybdic acid.

Both of the resulting solutions were mixed to prepare a mixed solution having a phosphomolybdic acid concentration of 50% by weight based on the total amount of composite formed.

As a result of dropping 100 μL of the prepared mixed solution onto white sheet glass followed by spin-coating under conditions of 1000 rpm and 20 seconds, a composite of poly(methyl methacrylate) and phosphomolybdic acid was able to be formed and a film composed of that composite was able to be produced.

Example 38

<Production of Composite Using Sodium Phosphotungstate>

Poly(2-hydroxyethyl methacrylate) having a number average molecular weight of 300,000 was dissolved in methanol to prepare a 10% by weight solution, and sodium phosphotungstate 30-hydrate ($Na_3 \cdot [PW_{12}O_{40}] \cdot nH_2O$, n≅30, Mw: 3486 (theoretical value of 30-hydrate), $WO_3$ content: 83 mol %) was dissolved in methanol to prepare a 50% by weight solution of sodium phosphotungstate.

Both of the resulting solutions were mixed to prepare a mixed solution having a sodium phosphotungstate concentration of 50% by weight based on the total amount of composite formed.

As a result of dropping 100 μL of the prepared mixed solution onto white sheet glass followed by spin-coating under conditions of 1000 rpm and 20 seconds, a composite of poly(2-hydroxyethyl methacrylate) and sodium phosphotungstate was able to be formed and a film composed of that composite was able to be produced.

Example 39

<Production of Composite Using Silicotungstic Acid>

Poly(2-hydroxyethyl methacrylate) having a number average molecular weight of 300,000 was dissolved in methanol to prepare a 10% by weight solution, and silicotungstic acid 26-hydrate ($H_4[SiW_{12}O_{40}] \cdot nH_2O$, n≅26, Mw: 3316 (theoretical value of 26-hydrate), $WO_3$ content: 84 mol %) was dissolved in methanol to prepare a 50% by weight solution of silicotungstic acid.

Both of the resulting solutions were mixed to prepare mixed solutions having silicotungstic acid concentrations of 30% by weight, 50% by weight and 70% by weight, respectively, based on the composite total amount polymer.

As a result of dropping 100 μL of the prepared mixed solutions onto white sheet glass followed by spin-coating under conditions of 1000 rpm and 20 seconds, composites of poly(2-hydroxyethyl methacrylate) and silicotungstic acid were able to be formed and films composed of those composites having three types of silicotungstic acid contents were able to be produced.

Example 40

<Example Using Photopolymerization for Polymerization Method: Photopolymerization of Methyl Methacrylate>

Phosphotungstic acid 30-hydrate ($H_3 \cdot [PW_{12}O_{40}] \cdot nH_2O$, n≅30, Mw: 3421 (theoretical value of 30-hydrate), $WO_3$ content: 81 mol %) was dissolved in 2-hydroxyethyl methacrylate to prepare a 50% by weight solution.

As a result of adding a polymerization initiator in the form of Irgacure 362 to the prepared 2-hydroxyethyl methacrylate solution of phosphotungstic acid at 0.5% by weight based on the 2-hydroxyethyl methacrylate and irradiating with UV light (245 nm) for 1 hour, a composite of poly(2-hydroxyethyl methacrylate) and phosphotungstic acid was able to be formed. The concentration of tungstic acid based on the total amount of composite was 50% by weight.

Furthermore, the previously defined transmittance reduction rate in all of the above-mentioned examples produced as composites of the present invention was less than 10%.

Heat Treatment for Composite

As a result of heating composites of poly(2-hydroxyethyl methacrylate) and phosphotungstic acid (phosphotungstic acid content: 5% by weight to 80% by weight (4.8% by weight to 77.3% by weight as the amount of tungstic acid)) for 10 minutes at 130° C., the hardness of the composites increased and moisture resistance and solvent resistance were confirmed to improve.

INDUSTRIAL APPLICABILITY

In the present invention, the refractive indices of various composites composed of commonly used polymers, such as poly(methyl (meth)acrylate) or polyvinyl acetate, were able to be arbitrarily adjusted, and these composites are expected to be used in microlens arrays of CCDs or C-MOS sensors and the like, in the light-scattering layers of illumination and displays, in light emitting devices such as organic EL, LEDs or semiconductor lasers, in the antireflection layers (films) of displays, solar cells or optical filters, in display elements using optical waveguide resists or a photonic structure, in the light scattering bodies of light trapping materials or random laser oscillation elements of DBR or DFB laser elements, and in the multilayer reflective films of optical filters or band pass filters and the like.

The invention claimed is:
1. A transparent film comprising a composite comprising a uniform dispersion of one or more acids and one or more polymers formed from a solution containing the one or more acids and the one or more polymers dissolved in the solution;
   wherein the one or more acids is selected from the group consisting of phosphotungstic acid, phosphomolybdic acid, and silicomolybdic acid,
   wherein the one or more polymers has a number average molecular weight of 1,000 to 10,000,000, the one or more polymers consists of repeating units obtained by polymerizing one or more compounds selected from the group consisting of compounds represented by the following formula 1, and the one or more polymers has one or more bonds selected from the group consisting of ester bonds and ether bonds, wherein the content of the one or more acids in the composite is 10% by weight to 95% by weight, wherein the total amount of the one or more acids and the one or more polymers in the composite is 90% by weight or more, and

[Chemical Formula 1]

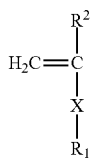

where, X represents a single bond or a linking group represented by —COO—, —CONR3- or —NHCO—, R1 and R3 respectively and independently represent: (i) a hydrogen atom, (ii) an alkyl group having 1 to 18 carbon atoms in which an arbitrary hydrogen may be substituted with a hydroxyl group or an alkenyl group having 1 to 18 carbon atoms, (iii) an aryl group having 6 to 18 carbon atoms in which an arbitrary hydrogen may be substituted with a methyl group, (iv) an aralkyl group having 7 to 18 carbon atoms, (v) a heterocyclic group having 3 to 18 carbon atoms, (vi) an alicyclic hydrocarbon group having 3 to 18 carbon atoms, (vii) polyethylene oxide having a degree of polymerization of 2 to 20 or (viii) a glycidyl group, R2 represents a hydrogen atom or a methyl group, and R1 and R3 may be linked through an ether bond, and when X is —COO— and R1 is the alkyl group, the compound represented by formula 1 is one or more compounds selected from the group consisting of methyl (meth)acrylate, butyl (meth)acrylate, norbornyl (meth)acrylate, benzyl (meth)acrylate, (meth)acrylic acid, and 2-hydroxyethyl (meth)acrylate.

2. The transparent film comprising the composite according to claim 1, wherein the compound represented by formula 1 is one or more compounds selected from the group consisting of methyl (meth)acrylate, butyl (meth)acrylate, norbornyl (meth)acrylate, benzyl (meth)acrylate, (meth) acrylic acid, 2-hydroxyethyl (meth)acrylate, and styrene.

3. The transparent film comprising the composite according to claim 1, wherein the one or more polymers is selected from the group consisting of poly(methyl (meth)acrylate), and poly(meth)acrylic acid, and poly(2-hydroxyethyl methacrylate).

4. The transparent film comprising the composite according to claim 1, wherein a transmittance reduction rate of the composite is 10% or less when the transparent film has a thickness of 5 μm.

5. A method for producing a transparent film comprising:
obtaining a solution by dissolving one or more acids and one or more polymers in a solvent; and
distilling off the solvent from the solution to form the film;
wherein the one or more acids is selected from the group consisting of phosphotungstic acid, phosphomolybdic acid and silicomolybdic acid, wherein the one or more polymers has a number average molecular weight of 1,000 to 10,000,000, the one or more polymers consists of repeating units obtained by polymerizing one or more compounds selected from compounds represented by the following formula (I) and the one or more polymers has one or more bonds selected from the group consisting of ester bonds and ether bonds, wherein the content of the one or more acids in the film is 10% by weight to 95% by weight, wherein the total amount of the one or more polymers and the one or more acids in the film is 90% by weight or more, and wherein the solvent is one or more compounds selected from the group consisting of ester-based compounds, alcohol-based compounds, ketone-based compounds, lactone-based compounds, glycol monoether monoester-based compounds, and glycol diester-based compounds;

[Chemical Formula 1]

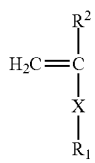

wherein, X represents a single bond or a linking group represented by —COO—, —CONR$_3$— or —NHCO—, R$_1$ and R$_3$ respectively and independently represent: (i) a hydrogen atom, (ii) an alkyl group having 1 to 18 carbon atoms in which an arbitrary hydrogen may be substituted with a hydroxyl group or an alkenyl group having 1 to 18 carbon atoms, (iii) an aryl group having 6 to 18 carbon atoms in which an arbitrary hydrogen may be substituted with a methyl group, (iv) an aralkyl group having 7 to 18 carbon atoms, (v) a heterocyclic group having 3 to 18 carbon atoms, (vi) an alicyclic hydrocarbon group having 3 to 18 carbon atoms, (vii) a polyethylene oxide having a degree of polymerization of 2 to 20 or (viii) a glycidyl group, R$_2$ represents a hydrogen atom or methyl group, and R$_1$ and R$_3$ may be linked through an ether bond, and when X is —COO— and R1 is the alkyl group, the compound represented by formula (I) is one or more compounds selected from the group consisting of methyl (meth)acrylate, butyl (meth)acrylate, norbornyl (meth)acrylate, benzyl (meth)acrylate, (meth)acrylic acid, and 2-hydroxyethyl (meth)acrylate.

6. The method according to claim 5, wherein the one or more polymers is selected from the group consisting of poly(methyl (meth)acrylate) and poly(meth)acrylic acid.

7. The method according to claim 5, wherein the distilling off the solvent from the solution is carried out on a base material coated with the solution.

8. The method according to claim 5, wherein the solvent is one or more selected from the group consisting of ethyl acetate, methanol and ethanol.

9. The transparent film of claim 1, wherein the content of the one or more acids in the composite is 16% by weight to 92% by weight.

* * * * *

UNITED STATES PATENT AND TRADEMARK OFFICE
CERTIFICATE OF CORRECTION

PATENT NO. : 10,131,777 B2
APPLICATION NO. : 14/408519
DATED : November 20, 2018
INVENTOR(S) : Hirotaka Ihara et al.

Page 1 of 1

It is certified that error appears in the above-identified patent and that said Letters Patent is hereby corrected as shown below:

In the Claims

In Column 31, Claim 1, Line 16, in [Chemical Formula 1], delete "$R^2$" and insert in its place -- $R_2$ --

In Column 31, Claim 1, Line 25, delete "—CONR3-" and insert in its place -- —CONR$_3$— --

In Column 31, Claim 1, Line 26, delete "R1 and R3" and insert in its place -- $R_1$ and $R_3$ --

In Column 31, Claim 1, Line 38, delete "R2" and insert in its place -- $R_2$ --

In Column 31, Claim 1, Line 39, delete "R1 and R3" and insert in its place -- $R_1$ and $R_3$ --

In Column 31, Claim 1, Line 40, delete "R1" and insert in its place -- $R_1$ --

In Column 32, Claim 5, Line 24, in [Chemical Formula 1], delete "$R^2$" and insert in its place -- $R_2$ --

In Column 32, Claim 5, Line 48, delete "R1" and insert in its place -- $R_1$ --

Signed and Sealed this
Seventeenth Day of March, 2020

Andrei Iancu
*Director of the United States Patent and Trademark Office*